United States Patent [19]

Pilat et al.

[11] Patent Number: 4,472,774
[45] Date of Patent: Sep. 18, 1984

[54] ENCACHEMENT APPARATUS

[75] Inventors: John F. Pilat, Hopkinton; Paul Bowden, Grafton, both of Mass.

[73] Assignee: Data General Corp., Westborough, Mass.

[21] Appl. No.: 425,024

[22] Filed: Sep. 27, 1982

[51] Int. Cl.³ .............................................. G06F 13/00
[52] U.S. Cl. ................................................... 364/200
[58] Field of Search ........................ 364/200 MS File

[56] References Cited
U.S. PATENT DOCUMENTS
4,164,017 8/1979 Randell et al. ..................... 364/200

Primary Examiner—Raulfe B. Zache
Attorney, Agent, or Firm—Gordon E. Nelson; Joel Wall; Jacobd Fvauk

[57] ABSTRACT

Encachement apparatus consisting of a first cache, a second cache connected to the first cache, registers for storing data, an adder receiving inputs from a first multiplexer connected to the first cache and a second multiplexer connected to the second cache and to the registers, and control apparatus connected to the first cache, the first multiplexer, and the second multiplexer. The first cache outputs a cache entry in response to a key. The cache entry contains a first displacement value, a base specifier specifying either one of the registers or the second cache, and in the case of entries specifying the second cache, a second displacement value. The first displacement value is output to the first multiplexer, the base specifier is output to the control apparatus, and the second displacement, if present, is output to the second cache. The control apparatus responds to the base specifier by causing the first multiplexer to select the displacement value output by the cache and causing the second multiplexer to select one of the values contained in the registers or the value output by the second cache in response to the second displacement. The adder then adds the value selected by the first multiplexer to the value selected by the second multiplexer and outputs the result.

4 Claims, 12 Drawing Figures

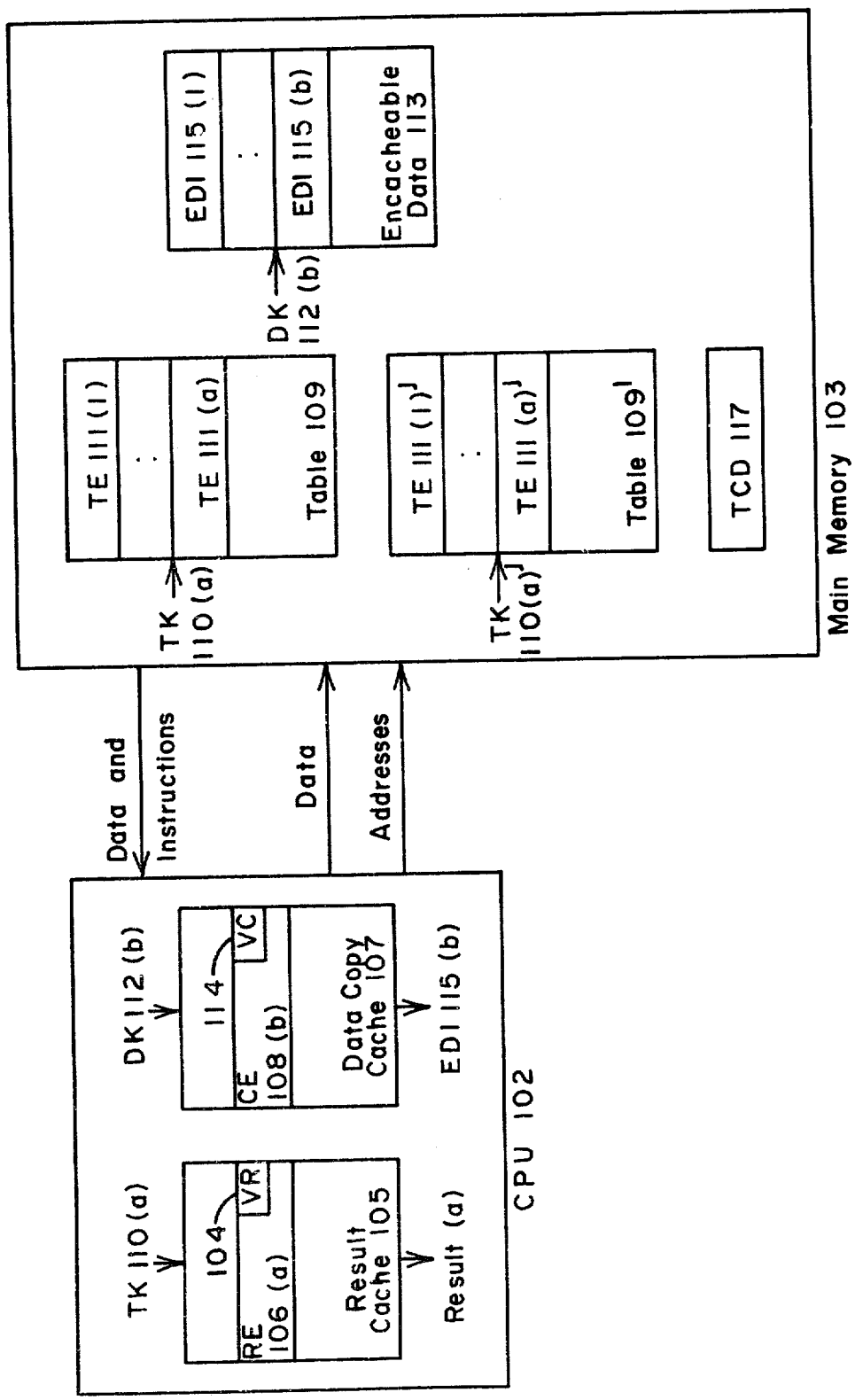
FIG. 1 Encachement in Prior Art Computer Systems

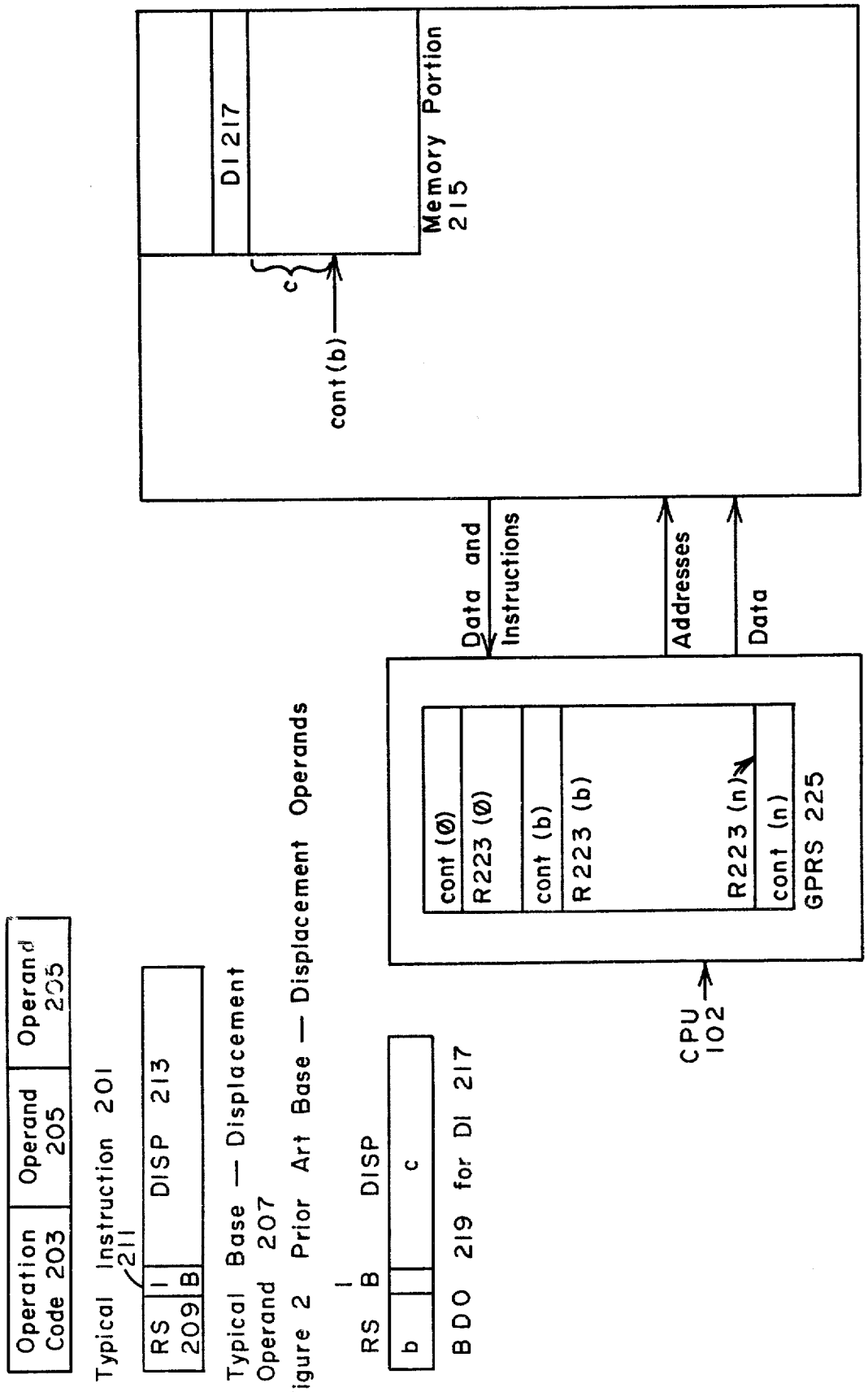

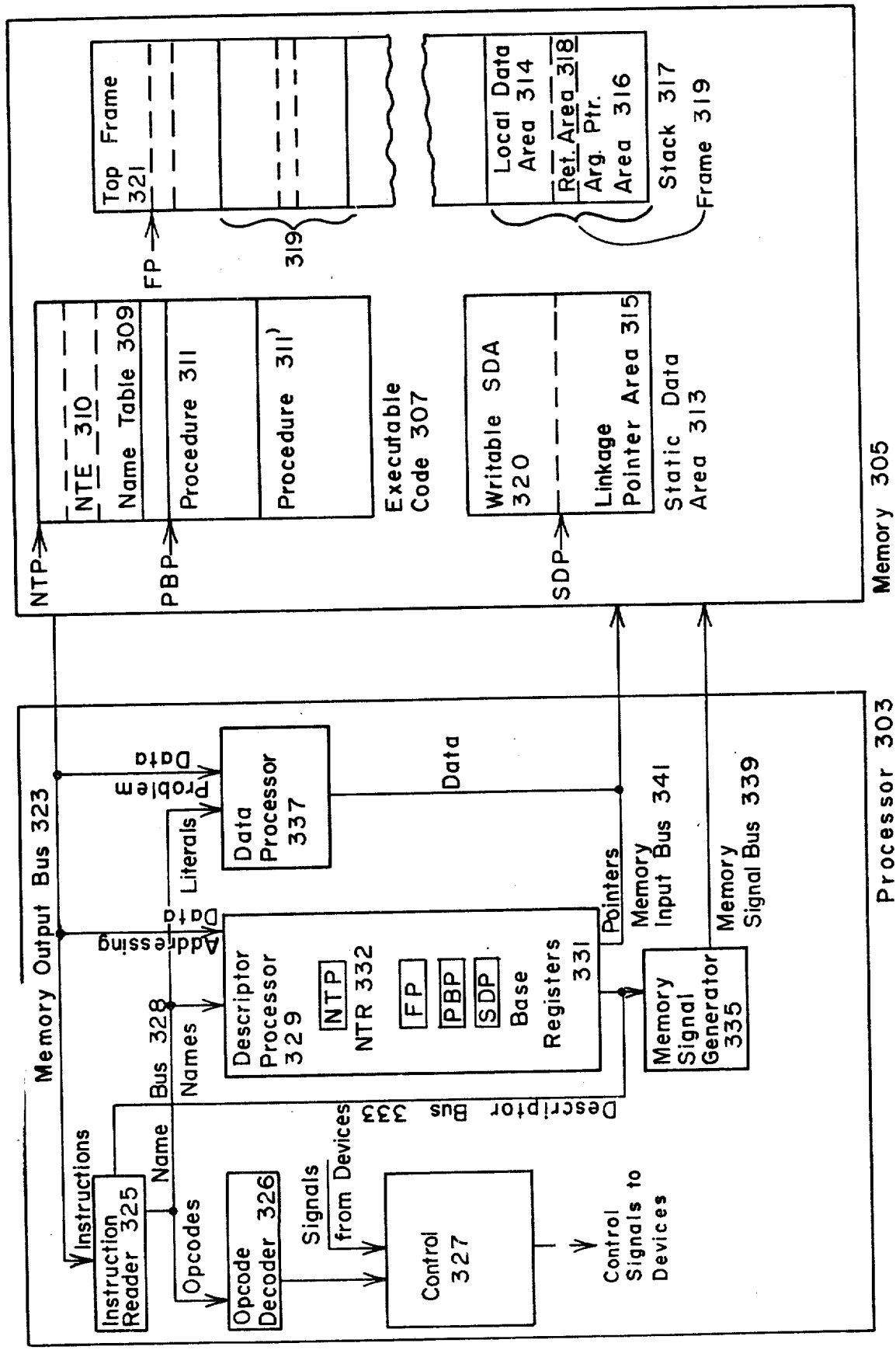
Fig. 3 ICS 301

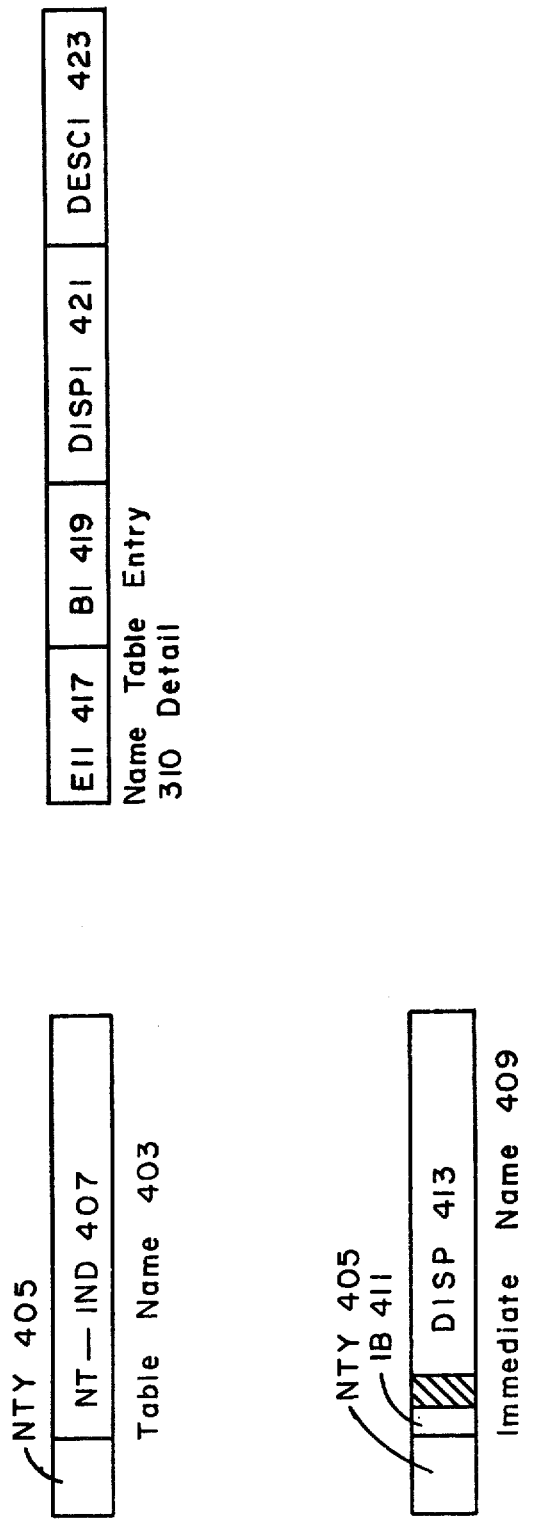
Figure 4  Names in ICS 301

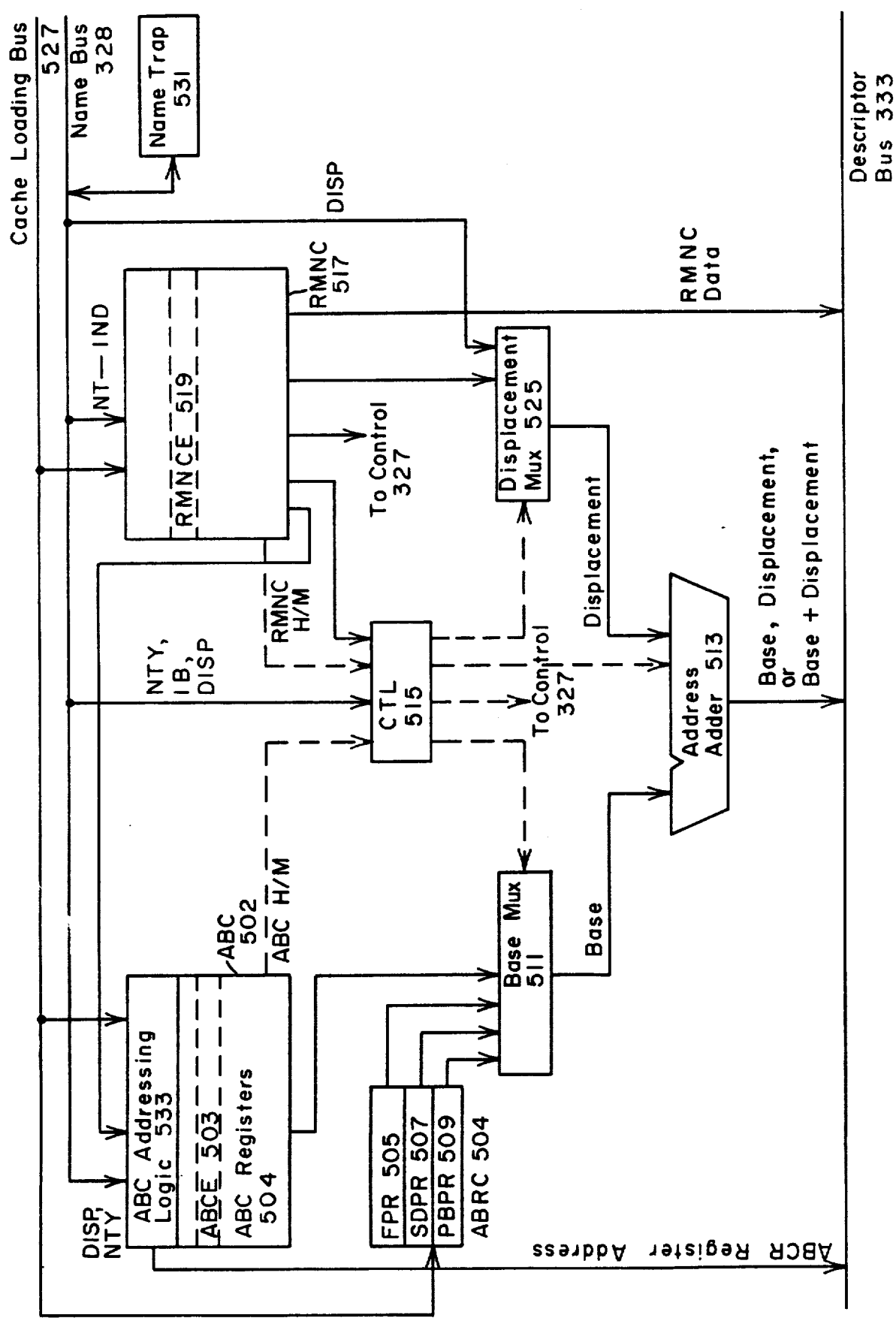
Fig.5 Improved Address Caches 501

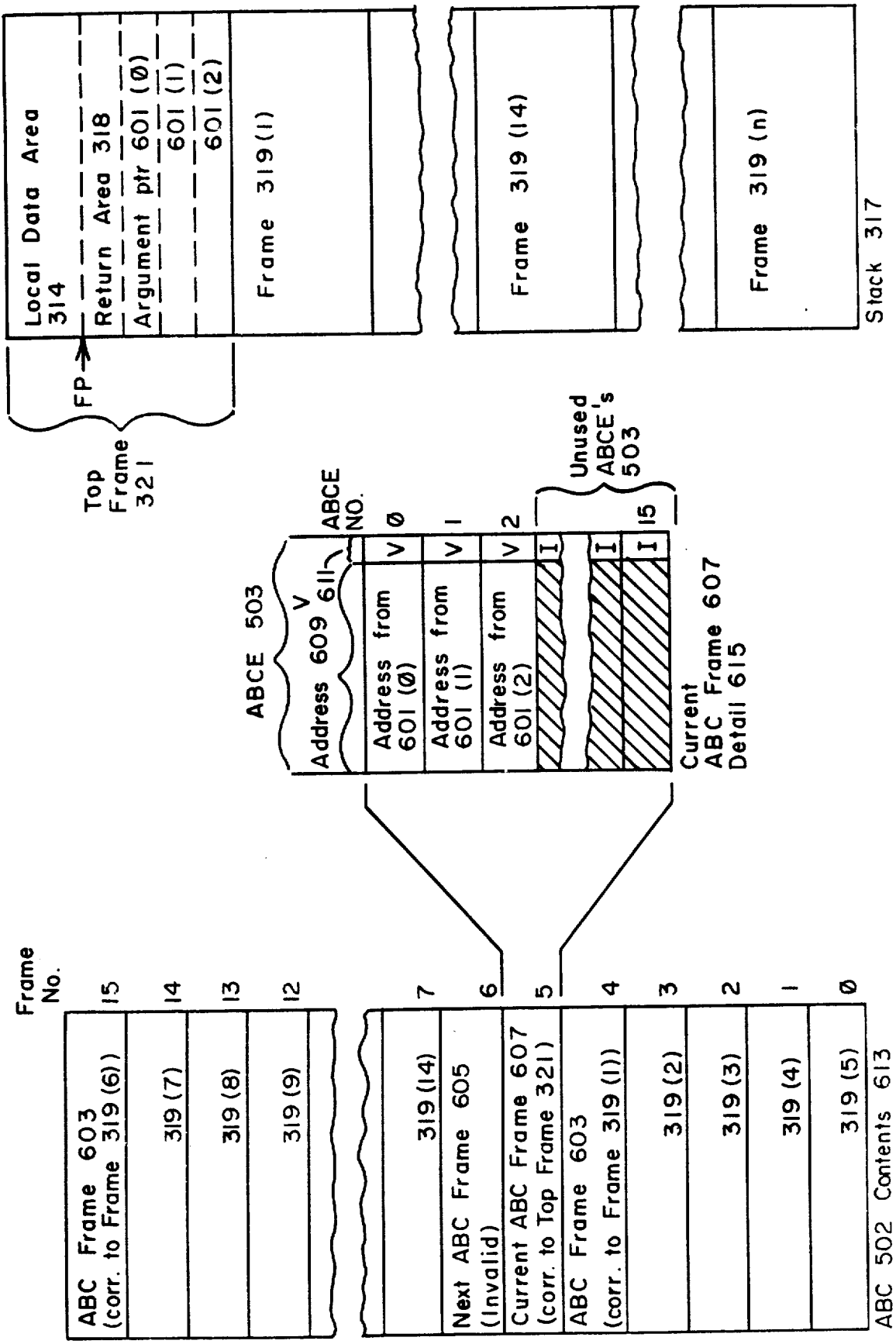
Fig. 6 Logical Structure of ABC 502

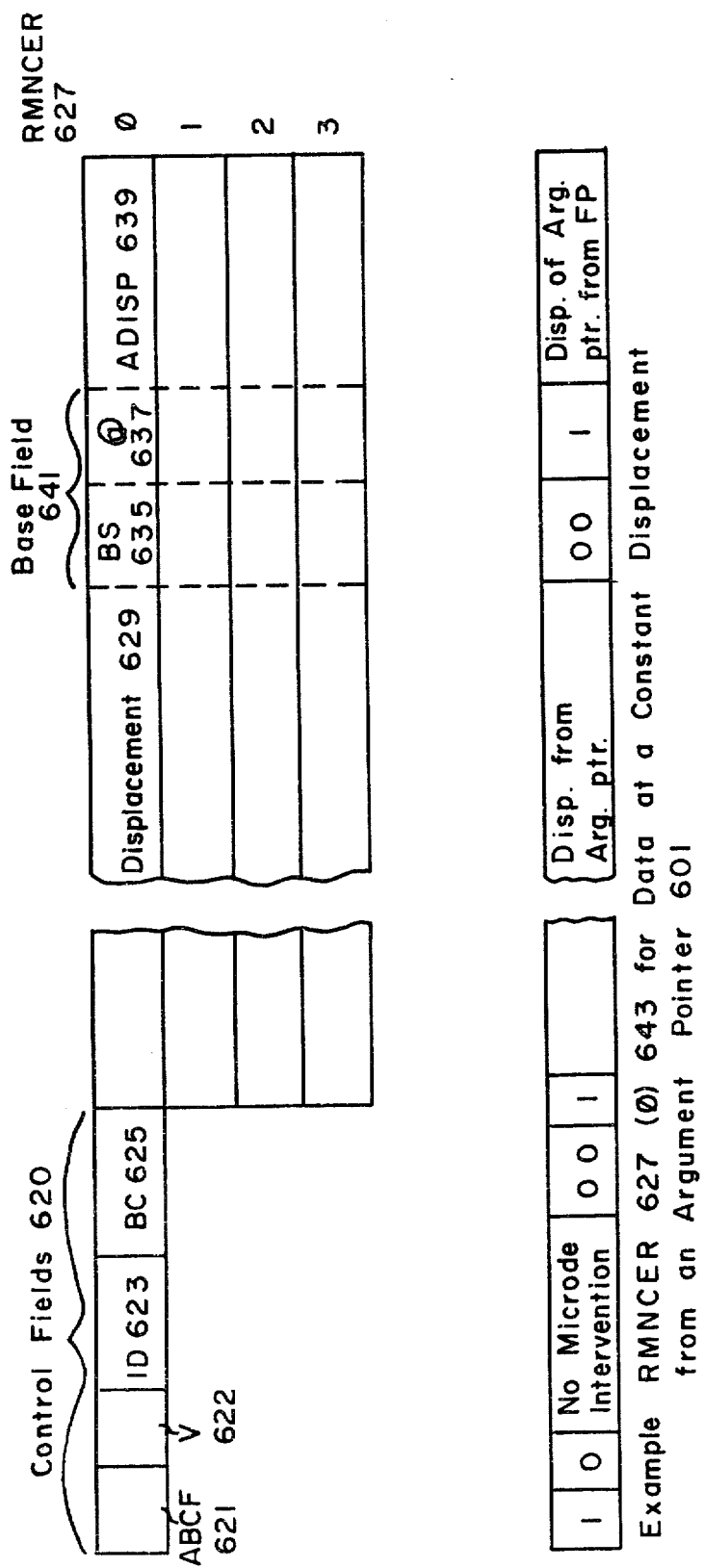
Fig. 6A Logical Structure of RMNCE 519

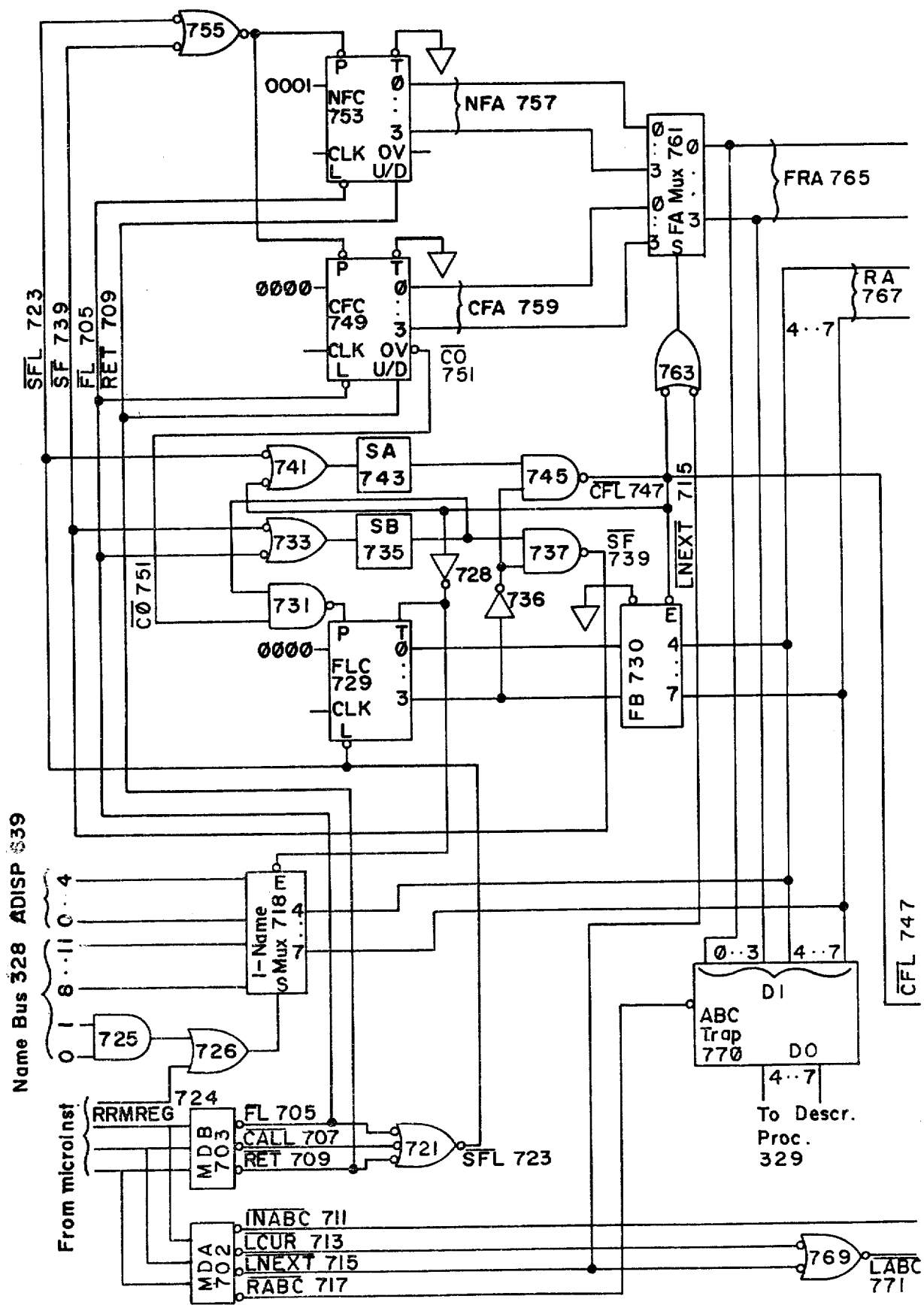
Fig. 7 Preferred Embodiment 701 of ABC Addr. Logic 533

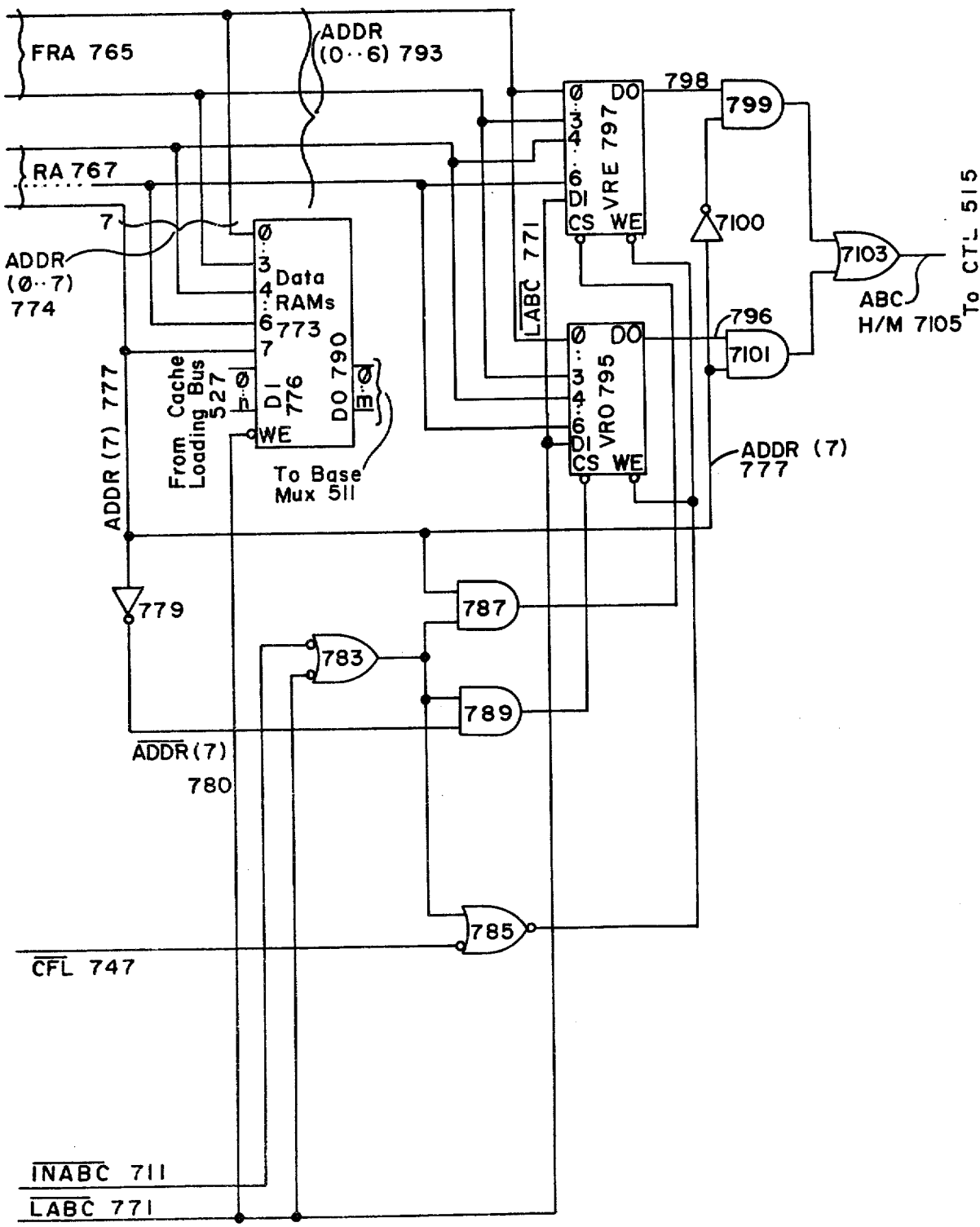
Fig. 7A Preferred Embodiment 772 of ABC Registers 504

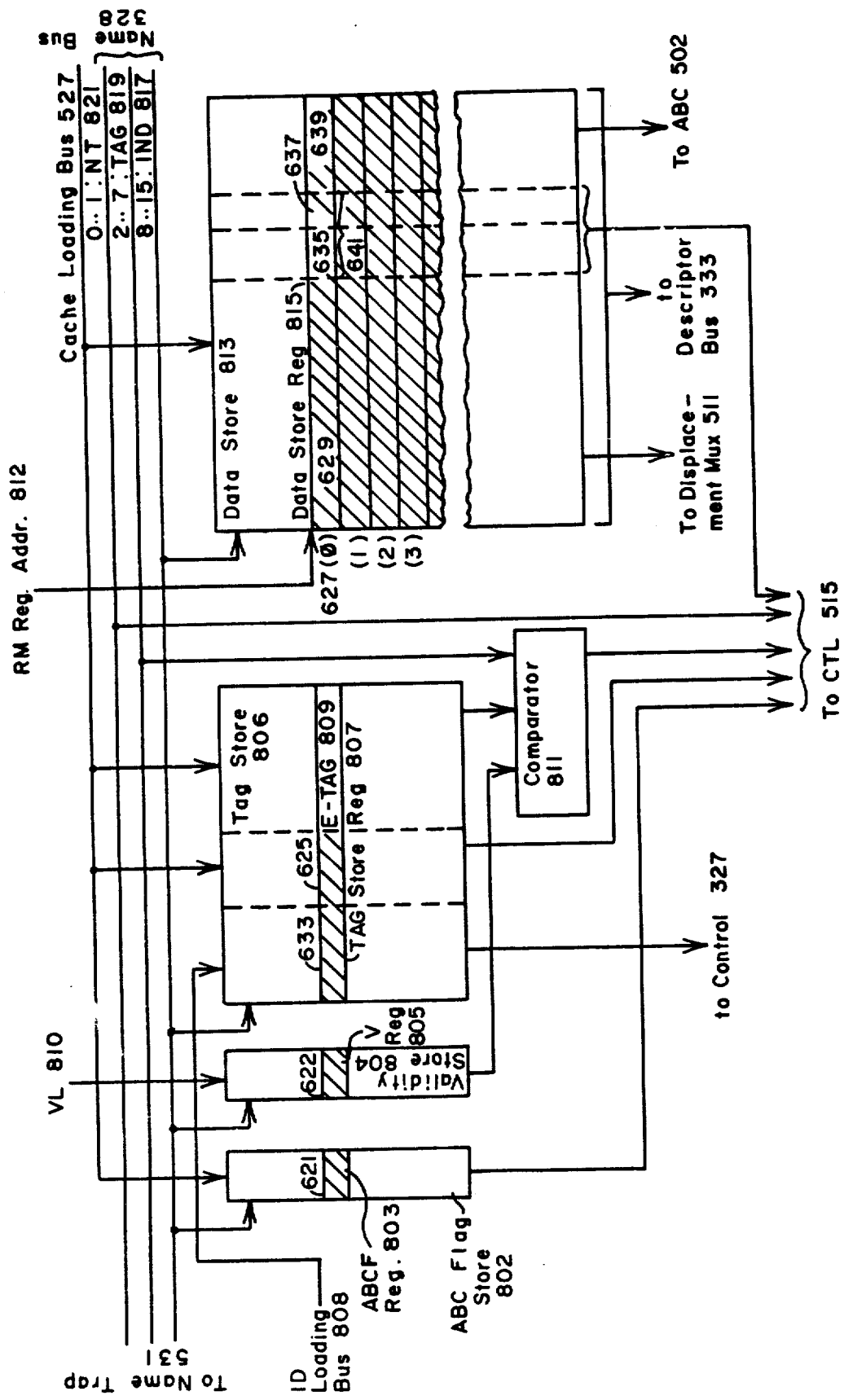
Fig. 8 Preferred RMNC Embodiment 801

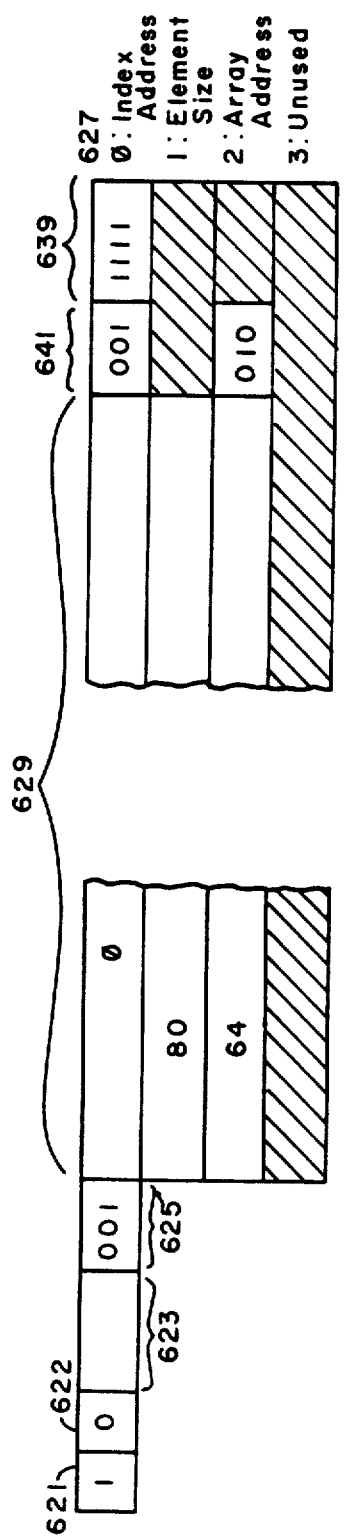
Fig. 9 RMNCE 519 for an Array Element

ENCACHEMENT APPARATUS

CROSS-REFERENCES TO RELATED APPLICATIONS

The present patent application is related to U.S. patent application Ser. No. 266,539, filed May 22, 1981 and U.S. patent application Ser. No. 301,999, filed Sept. 11, 1981, and other patent applications related to these patent applications.

BACKGROUND OF THE INVENTION

1. Field of the Invention

The present invention relates generally to digital computer systems employing caches in their CPUs, and more specifically to digital computer systems employing caches to interpret operands in instructions.

2. Description of Prior Art—FIGS. 1 and 2

2.1 Introduction to Caches

Many prior art computer systems employ caches in their CPUs. A cache is fast memory within the CPU which is used to store data items frequently used by the CPU in executing programs. Access to data items stored in a cache is more rapid than than access to data items contained in the computer system's main memory, and consequently, encachement of frequently-used data items can speed execution of programs by the computer system.

Access to a cache is by means of a key. Data items which may be encached are associated with keys, and the key is input to the cache. If the cache contains the data item associated with the key, the cache outputs the data item; otherwise, ting the cache produces a cache miss signal. The CPU responds to the cache miss signal by loading the data item corresponding to the key into the cache.

In general, caches are used for two kinds of data items; those which are copies of data items contained in main memory and those which are the results of operations performed by the CPU. FIG. 1 is a block diagram illustrating both uses of caches in prior art computer system. Computer System 101 has two main components: CPU 102 and Main Memory 103. Main Memory 103 contains data items and instructions, and CPU 102 performs operations on the data items in Main Memory 103 in response to instructions. CPU 102 includes two caches, Result Cache 105 and Data Copy Cache 107. Main Memory 103 contains Table 109, containing Table Entries (TEs) 111(1) through 111(n), Table 109', containing TEs 111(1)' through 111(k)', Table Computation Data (TCD) 117, and Encacheable Data 113, containing Encacheable Data Items (EDI) 115(1) through 115(n). TEs 111 are identified by Table Keys (TKs) 110 and EDIs 115 are identified by Data Keys (DKs) 112.

Result Cache 105 contains Result Entries (REs) 106. Each RE 106 contains a VR Field 104 indicating whether RE 106 is valid. A valid RE 106 corresponds to a single TE 111(a) and contains results obtained from computations using TE 111(a) and TCD 117. Valid RE 106 (a) corresponding to TE 111(a) is accessible by means of TK 110 (a) corresponding to TE 111(a).

Data Copy Cache 107 contains Copy Entries (CE) 108. Each CE 108 contains a VC Field 114 indicating whether CE 108 is valid. If it is, CE 106 contains a copy of the data in a single EDI 115(b) and is accessible by means of DK 112(b) corresponding to EDI 115(b).

In both Data Copy Cache 107 and Result Cache 105, a cache miss occurs when a key is presented to the cache and the cache either lacks an entry corresponding to the key or the entry corresponding to the key is invalid. CPU 102 responds to the cache miss by loading the cache entry corresponding to the key. In the case of Data Copy Cache 107, nothing more is involved than fetching the data in the proper EDI 115 from memory and loading it into Data Copy Cache 107 in a CE 108 accessed by the corresponding DK $11_2$. In the case of Result Cache 105, data must be fetched from the proper TE 111 and TCD 117, calculations performed, and the result loaded into the proper RE 106 in Result Cache 105.

2.2 Limitations of Prior-art Caches

The use of caches in any digital computer system is limited by the fact that the encached data items may become invalid. In the caches of FIG. 1, an encached data item may be become invalid in one of three ways:

* If a data item is a copy of a data item in Main Memory 103, the encached data item becomes invalid when the data item in Main Memory 103 changes its value.
* If a key changes its meaning, the encached data item accessed by the key becomes invalid.
* If an encached result is calculated using another data item and that data item changes its value, the encached result becomes invalid.

FIG. 1 illustrates all of these possibilities. If EDI 115 (b) changes its value, then CE 108 (b) is no longer a copy of EDI 115 (b) and CE 108 (b) must be invalidated. TK 110 may serve as a key to either Table 109 or Table 109'; if CPU 102 ceases using Table 109 and begins using Table 109', REs 106 do not correspond to TEs 111', and all REs 106 in Result Cache 105 must be invalidated; if a data item in TCD 117 changes its value, all REs 106 in Result Cache 105 depending on that data item must be invalidated. In the last case, it is generally impossible to determine which RE 106 depends on a given data item in TCD 117, so any change generally requires invalidation of all REs 106.

Sometimes, it is possible to reload the invalidated cache entry when it is invalidated. Generally, however, the invalidated cache entry is loaded when a cache miss occurs. Thus, after a change in TCD 117 has invalidated Result Cache 106, Result Cache 106 is gradually reloaded with results calculated from the new value of TCD 117 as misses occur on TKs 110. If TCD 117 does not change value often, the efficiency gained from use of Result Cache 105 outweighs the time required to load it; however, if the changes are frequent, REs 106 are generally invalid and the use of Result Cache 106 in CPU 102 results in no gain or even a loss of efficiency.

2.3 Encachement of Memory Addresses Corresponding to Operands—FIGS. 2A and 2B

The problems of caches just described, together with certain characteristics of standard computer architectures, have made the use of caches difficult in one key area: the translation of an operand which specifies data in an instruction into the memory address of the data. As illustrated in FIG. 2A, a typical Instruction 201 for CPU 102 contains an Operation Code 203 and one or more Operands 205. Operation Code 203 specifies an operation to be performed by CPU 102 on data specified by Operand 205. Generally, Operand 205 is a Base-Displacement Operand 207. In such operands, there are at least two fields: RS Field 209, specifying a general-purpose register in CPU 102, and DISP Field 213, containing a binary integer. The integer specifies a displacement, and the specified register in CPU 102 contains a base address. The address of the data represented by Base-Displacement Operand 207 is obtained by adding the displacement specified by DISP Field 213 to the base address contained in the general-purpose register specified by RS Field 207. In addition, Base-Displacement Operand 207 may contain other fields. Here, Base-Displacement Operand 207 further contains an indirection bit, IB 211, specifying that the address in Main Memory 103 obtained by adding the value of DISP Field 213 to the value contained in the register specified by RS Field 207 is not the address of the data represented by the operand, but rather the address of a pointer to the data. A pointer is a data item whose value is the address of data.

FIG. 2B provides an example of how an address is calculated from operands specifying a register containing a base address and a displacement. CPU 102 includes general-purpose register set GPRS 225, containing general-purpose registers R 223(0) through R 223(n). For the purposes of this discussion, a general-purpose register is any register which an instruction executed by CPU 102 may set to an arbitrary value. The contents of a register R 223 is specified in FIG. 2B by cont(x), where x is the number of R 223. Memory 103 contains Memory Portion 215, which in turn contains Data Item 217. Data Item 217 is represented in an instruction by BDO 219, a Base-Displacement Operand 205 of the type just described. In BDO 219, b represents the value of RS Field 209 and c the value of DISP 213. R(b) specified by RS Field 209 contains the address in Memory Portion 215 specified by cont(b). Arrow 221 identifies the location specified by cont(b) in Memory Portion 215. CPU 102 obtains the address of Data Item 217 by performing the calculation cont(b)+c.

Base-displacement Operands 207 referring to Data Item 217 may occur over and over in a computer program executing on CPU 102 and Data Item 217's address does not change. Nevertheless, it is impractical to encache Data Item 217's address in a cache employing Base-Displacement Operands 207 as keys. This is the case because such a cache is effectively a result cache like Result Cache 105 of FIG. 1. The contents of each entry in the cache are calculated using the value of R 223 specified in the operand. However, instructions executed by CPU 102 may change the value of that R 223 at any time and in an arbitrary fashion, so the specified R 223 bears the same relationship to the encached address as a data item in TCD 117 bears to a RE 106 calculated from it. Just as the RE 106 must be invalidated each time the data item in TCD 117 it is derived from changes its value, so must the encached address be invalidated each time R 223 specified in the operand corresponding to the address changes its value.

The present invention provides an improved computer system wherein addresses translated from operands may be encached and encachement apparatus wherein certain changes in values used to compute the encached data do not render the encached data invalid. The present invention thereby overcomes the above-mentioned disadvantages of prior art computer systems and encachement apparatus.

SUMMARY OF THE INVENTION

The present invention relates to encachement apparatus in a digital computer system for encaching values consisting of component values which change in response to different operations of the digital computer system. One kind of component values is kept in one cache, together with specifiers specifying the other kind of component value. In response to a key, the first cache outputs a component value of the first kind and a specifier; the specifier is then used to obtain the second kind of component value from a second cache or register. The two component values are then simultaneously output from the first cache and the second cache or register to combining apparatus such as an adder, and the combining apparatus combines the values to form the desired value. A register or cache containing a given kind of component need only be reloaded when the digital computer system performs an operation changing that component, and consequently, the encachement apparatus need be completely reloaded less frequently than prior-art cache apparatus.

Encachement apparatus of the type just described is particularly advantageous in a digital computer system employing operands which represent data by specifying an entry in a table. The table entry specifies a direct base-displacement address by means of a base specifier identifying a base address and a displacement specifier from which a displacement from the base address may be calculated. The data represented by the operand is located at the address obtained by adding the displacement to the base address.

In some digital computer systems employing direct base-displacement addressing, certain base addresses change on every call and return operation, while certain displacements change only on certain call and return operations. In such a digital computer system which employs encachement apparatus of the type just described, a cache responsive to the operands may contain displacements calculated from the table entries and cache base specifiers specifying the same base address as the one specified in the table entry. A set of registers may contain the base addresses. The base addresses from the registers and the displacement from the cache are both output to combining means including an adder. Control apparatus responsive to the cache base specifiers selects the base address specified by the cache base specifier, and the adder adds the selected base address to the displacement. While certain of the base addresses in the registers must be changed on every call operation and every return operation, the cache need be invalidated only on the relatively rare call and return operations which change the table.

A related kind of encachement apparatus is advantageous when a digital computer system of the kind just described employs indirect base-displacement addressing using base pointers whose values do not change between certain operations of the digital computer system. In such base-displacement addressing, the table entry contains a base specifier, a first displacement specifier, and a second displacement specifier. A first displacement calculated from the first displacement specifier gives the displacement of the base pointer from the base address identified by the base address specifier and a second displacement calculated from the second displacement specifier gives the displacement of data represented by the operand corresponding to the table entry from the address specified by the base pointer. The encachement apparatus may include a first cache containing the first displacement and the second displacement and a second cache connected to the first which contains the base pointers and receives the first displacement from the first cache. Outputs of both the first cache and the second cache are connected to combining apparatus. When an operand is presented to the first cache, the second displacement and the base pointer specified by the first displacement are simultaneously output to the combining apparatus. Again, the first cache need be invalidated only when an operation of the digital computer system changes the table and the second cache need be invalidated only when an operation changes the base address used to locate the base pointers.

The two kinds of encachement apparatus just described may be combined in a single apparatus for encaching addresses derived both directly and indirectly. Such an apparatus consists of a first cache, a second cache, a set of registers, combining apparatus, and control apparatus. The first cache receives and responds to the operands. It contains cache base specifiers specifying a base address and whether direct or indirect base-displacement addressing is to be used, the first displacement, and, when the base specifier so specifies, the second displacement. The second cache contains the base pointers and receives the second displacement from the first cache. The set of registers contains base addresses. The outputs of the first cache, the second cache, and the set of registers are all connected to the combining apparatus. The control apparatus receives the cache base specifier from the first cache and selects inputs to the combining apparatus. When the cache base specifier specifies direct addressing, the control apparatus selects the proper base address from the set of registers and the combining apparatus combines it with the first displacement. When it specifies indirect addressing, the control apparatus selects the output of the second cache and the combining apparatus combines the base pointer output by the second cache in response to the second displacement with the first displacement.

Certain base pointers in a digital computer system employing the encachement apparatus may be contained in frames of a stack in the digital computer system's memory. One of the base addresses in the digital computer system specifies the top frame of the stack. The cache containing copies of base pointers located in frames in the memory stack may itself contain a stack. Frames of the cache stack correspond to frames of the stack in memory. A cache stack frame corresponding to a memory stack frame contains a copies of base pointers from the memory stack frame to which it corresponds. The order of the base pointers in the cache stack corresponds to their order in the corresponding memory stack. A current frame in the cache stack corresponds to the top frame of the memory stack. As described above, displacements from the base address specifying the top frame serve as keys to the base pointer cache. When the key is presented to the base pointer cache, the cache outputs the base pointer in the current frame which is a copy of the base pointer specified by the displacement.

Each time an operation of the digital computer system adds a new top frame to the memory stack, a new cache frame is added to the cache stack and loaded with copies of base pointers from the new top frame. The new cache frame then becomes the current frame. Each time an operation of the digital computer system removes the current top frame and makes the previous top frame the new current top frame, the cache frame corresponding to the previous top frame becomes the new current frame. The cache stack is circular: there are a fixed number of frames in the cache stack, and if the current frame is the last frame in the cache stack and a new top frame is added to the memory stack, the first frame in the cache stack becomes the new current frame. In order to prevent new cache stack frames from overlapping old cache stack frames, each time the current frame changes, the data in the frame above the current frame is invalidated.

There are two advantages to the use of a cache stack in the base pointer cache: first, when a new top frame is created, the cache stack frame corresponding to the new top frame may be loaded by the same operation which creates the new top frame, so that copies of the base pointers in the new top frame are available in the cache stack's current frame on completion of the operation. Second, since a number of cache stack frames corresponding to the memory stack frames preceding the top frame are contained in the cache, it is generally not necessary to load a cache stack frame when a preceding memory stack frame becomes the new top frame.

The cache apparatus further includes apparatus for the rapid invalidation of cache frames and an arrangement of the registers for the base addresses allowing rapid output of the base addresses to the combining means.

It is thus an object of the present invention to provide an improved digital computer system.

It is another object of the invention to provide apparatus for encaching data consisting of components whose values change as a consequence of different operations of the computer system.

It is a further object of the invention to provide apparatus for encaching base-displacement addresses consisting of a base address component which changes with every call operation and every return operation and a displacement component which changes only with certain call operations and certain return operations.

It is still another object of the invention to provide apparatus responsive to operands specifying table entries containing base address specifiers and displacement specifiers for encaching base-displacement addresses calculated using the table entries.

It is yet another object of the invention to provide apparatus for encaching indirect base-displacement addresses calculated using base pointers.

It is a still further object of the invention to provide encachement apparatus which includes a stack and which responds to keys by outputting only data contained in a current frame of the stack.

It is a yet further object of the invention to provide improved apparatus for invalidating cache entries.

Other objects, advantages, and features of the present invention will be understood by those of ordinary skill in the art after referring to the following detailed description of the preferred embodiment and drawings, wherein:

BRIEF DESCRIPTION OF THE DRAWINGS

FIG. 1 is a diagram showing encachement in prior-art computer systems;

FIG. 2 is a diagram showing prior-art base-displacement operands;

FIG. 2A is a diagram showing prior-art operand to address translation;

FIG. 3 is a conceptual block diagram of an improved computer system using base-displacement and indirect base-displacement addressing and name tables;

FIG. 4 is a diagram of names in the improved computer system of FIG. 3;

FIG. 5 is a block diagram of the improved address caches used in the improved computer system of FIG. 3;

FIG. 6 is a conceptual diagram of the logical structure of the argument base cache of FIG. 5;

FIG. 6A is a conceptual diagram of the logical structure of the raw materials name cache of FIG. 5;

FIG. 7 and FIG. 7A are logic diagrams showing a preferred embodiment of the argument base cache of FIG. 5;

FIG. 8 is a block diagram showing a preferred embodiment of the raw materials name cache of FIG. 5; and FIG. 9 is a diagram of an example raw materials name cache entry.

DESCRIPTION OF THE PREFERRED EMBODIMENTS

The Description of the Preferred Embodiments begins with an overview of an Improved Digital Computer System (ICS) which allows encachement of data addresses and information needed to derive them, then presents an overview of encachement apparatus which may be used particularly advantageously in the ICS, and finally presents a detailed description of a preferred embodiment of the encachement apparatus.

1. An Improved Digital Computer System Permitting Encachement of Data Addresses

The ICS has been described in detail in U.S. patent application Ser. No. 266,539, filed May 22, 1981, and U.S. patent application Ser. No. 301,999, filed Sept. 11, 1981, and other patent applications related to these patent applications, and is described herein only to the extent necessary to understand the present invention.

1.1 Overview of ICS 301—FIG. 3

FIG. 3 presents a conceptual block diagram of ICS 301. ICS 301 has two main components: Memory 305, for storing data and instructions, and Processor 303, for performing operations on data received from Memory 305 in response to instructions received from Memory 305. Processor 301 is connected to Memory 305 by Memory Output Bus 323, which provides data and instructions stored in Memory 305 to Processor 303, Memory Input Bus 341, which provides data from Processor 303 to Memory 305, and Memory Signal Bus 339 which carries memory signals from Processor 303 to Memory 305. The memory signals specify at least a location in Memory 305 and whether the contents of the location are to be fetched from Memory 305 to Processor 303 or data from Processor 303 is to be stored at that location.

1.1.1 Contents of Memory 305

When ICS 301 is executing instructions for a user, Memory 305 contains at least Executable Code 307 and Stack 317, and may also contain Static Data 313. Executable Code contains at least one Procedure 311 and at least one Name Table 309. Procedure 311 contains a sequence of instructions executable by Processor 303, and Name Table 309 contains Name Table Entries (NTEs) 310 corresponding to certain operands contained in instructions in Procedure 311. NTE 310 corresponding to an operand contains information from which a descriptor for the data item represented by the operand may be derived. In ICS 301, a descriptor specifies the address of the data item, its length, and other information. The following discussion is concerned only with that portion of the descriptor specifying the address.

The instructions executable by Processor 303 include a call instruction and a return instruction. When Processor 303 executes a call instruction in a Procedure 311, it suspends further execution of instructions in Procedure 311 and begins execution of instructions in a Procedure 311' specified in the call instruction. When Processor 303 executes a return instruction in Procedure 311', it terminates execution of instructions in Procedure 311' and resumes execution of instructions in Procedure 311.

A single execution of a Procedure 311' begins with the execution of a call instruction in a Procedure 311 which specifies Procedure 311' and ends with the execution of a return instruction in Procedure 311'. If Procedure 311' itself contains a call instruction specifying a Procedure 311'', the execution of Procedure 311' is suspended during the execution of Procedure 311'' and of any other Procedures 311 called as a result of that execution. Thus, there is at any one time only one Procedure 311 whose execution is not suspended, i.e., whose instructions are currently being executed.

Besides specifying Procedure 311' to be executed, a call instruction may also specify arguments, i.e., data available to the execution of Procedure 311 executing the call instruction which that execution provides to the execution of Procedure 311' commenced by the call instruction. Procedure 311' may be contained in the same section of Executable Code 307 as Procedure 311, or in a different section of Executable Code 307, and may use the same Name Table 309 as Procedure 311 or a different Name Table 309.

Stack 317 contains a sequence of Frames 319. Each Frame 319 contains data used in a single execution of a Procedure 311. Top Frame 321 is a Frame 319 which contains data being used in the execution of Procedure 311 for which Processor 303 is currently executing instructions. The remaining Frames 319 contain data used in suspended executions of Procedures 311. When a call instruction in Procedure 311 is executed, a new Frame 319' is created for the execution of Procedure 311' specified in the call instruction and Frame 319' becomes Top Frame 321; on execution of a return instruction in Procedure 311', the execution of Procedure 311' corresponding to Top Frame 321 terminates, the suspended execution of Procedure 311 resumes, and Frame 319 below Top Frame 321 again becomes Top Frame 321. The previous Top Frame 321 ceases to exist, and the area occupied by it in Memory 305 may be used for new Frames 319 or other data.

Each Frame 319 may contain areas for three different kinds of data. Local Storage Area 314 contains data items whose values may change during the execution of Procedure 311 which corresponds to Frame 319. Return Area 316 contains data items used by the return instruction which terminated the execution of Procedure 311' corresponding to Frame 319 to resume the execution of Procedure 311. Argument Pointer Area 316 contains argument pointers, that is, pointers containing the addresses of data items used as arguments in the call instruction which began the execution of Procedure 311 which corresponds to Frame 319. In ICS 301, only the call instruction whose execution results in the creation of a Frame 319 may set the values of data items in Return Area 315 and the values of argument pointers in Argument Pointer Area 316; other instructions may not assign values to these areas. Consequently, the values of the pointers and data items in these areas do not change during the life of Frame 319.

A Stack 317 may have associated with it one or more Static Data Areas 313. Each Static Data Area 313 contains data available to one or more of the executions of Procedures 311 which have Frames 319 on Stack 317. Static Data Area 313 contains areas for two different kinds of data. Writable Static Data Area 320 contains data whose values may change during the life of Static Data Area 313. Linkage Pointer Area 315 contains linkage pointers, i.e., pointers to Procedures 311 and pointers to data items which are used in an execution of a Procedure 311 which has a Frame 319 on Stack 317 but are contained in neither Automatic Data 314 belonging to that Frame 319 nor Writable Static Data 320 in Static Data Area 313 corresponding to the execution. ICS 301 automatically places linkage pointers in Linkage Pointer Area 313 when Static Data Area 313 is created. No instructions for ICS 301 allow values to be assigned to Linkage Pointer Area 313, and thus, pointers in Linkage Pointer Area 313 do not change their values during the life of Static Data Area 313.

1.1.2 Components of Processor 303

Turning now to Processor 303, the components of Processor 303 operate under control of Control 327. In a present embodiment of ICS 301, Control 327 executes microinstruction sequences. Microcommands in the microinstructions specify operations to be performed by the hardware devices making up Processor 303 and decoders decode the microcommands to provide signals which enable or disable hardware devices as required. Control 327 executes microinstruction sequences in response to instructions from Procedures 311 and to signals produced by the hardware devices making up Processor 303.

For purposes of the present discussion, Processor 303 has the following functional divisions in addition to Control 327: Instruction Reader 325, Opcode Decoder 326, Descriptor Processor 329, Memory Signal Generator 335, and Data Processor 337. The divisions are discussed in the above order.

Instruction Reader 325

Instruction Reader 325 breaks instructions into operation codes and operands and places the operation codes and operands onto Name Bus 328. Instruction Reader 325 also provides a descriptor for the next instruction, which it places on Descriptor Bus 333.

Opcode Decoder 326

Opcode Decoder 326 receives each operation code from Instruction Reader 325 and decodes it into the location of the sequence of microinstructions which executes the instruction. It provides this location to Control 327, which then executes the microinstruction sequence.

Descriptor Processor 329

Descriptor Processor 329 receives operands representing data items in Memory 305 from Instruction Reader 325 via Name Bus 328 and addressing data from Memory Output Bus 323. The addressing data includes pointers and other values used to calculate addresses. With operands corresponding to NTEs 310, the addressing data includes NTE 310 corresponding to the name. Descriptor Processor 329 translates the operands and the pointers into descriptors and translates descriptors into pointers. Descriptors from Descriptor Processor 329 are placed on Descriptor Bus 333, while pointers from Descriptor Processor 329 are placed on Memory Input Bus 341.

Memory Signal Generator 305

Memory Signal Generator 305 receives descriptors from Descriptor Processor 329 and Instruction Reader 325. Memory Signal Generator 305 responds to the descriptors and to signals from Control 327 by generating memory signals on Memory Signal Bus 339.

Data Processor 337

Data Processor 337, finally, receives data items from Memory Output Bus 323, processes them under control of Control 327, and places the results on Memory Input Bus 341.

1.2 Calculation of Addresses in ICS 301

ICS 301 employs base-displacement addressing. However, the base addresses are not contained in general-purpose registers which allow them to be altered at arbitrary times and in arbitrary manners. In ICS 301, addresses are calculated using architectural base addresses. The architectural base addresses of ICS 301 change only when ICS 301 executes a call instruction or a return instruction, and the manner in which they change is not under control of the programmer. Instead, the microcode executed by Control 327 in response to a call or return instruction resets the architectural base addresses as required for the execution of a Procedure 311 commenced by the call instruction or resumed by the return instruction.

1.2.1 Architectural Base Addresses

There are three architectural base addresses employed by ICS 301, FP, SDP, and PBP. In FIG. 3, arrows in Memory 305 labelled with the names of the architectural base addresses indicate the locations specified by them. FP specifies the bottom of Automatic Data 314 in Top Frame 321; SDP specifies the bottom of Writable SDA 320 in Static Data Area 313 used by the execution of Procedure 311 represented by Top Frame 321; PBP represents a location in Executable Code 307 associated with one or more Procedures 311. Displacements from FP may not specify addresses outside of Top Frame 321; displacements from SDP may not specify addresses outside of the current Static Data Area 313; displacements from PBP, finally, may not specify addresses outside of Procedures 311 associated with that PBP. A further address of importance is NTP, which represents the location of Name Table 309 used by Procedure 311. Displacements from NTP may specify only locations in Name Table 309.

The values of FP, SDP, PBP, and NTP change only when a call instruction or a return instruction is executed by ICS 301. Since every execution of a Procedure 311 has its own Frame 319, FP changes every time a call instruction or a return instruction is executed. SDP changes whenever a call instruction initiates an execution of a Procedure 311' which uses a different Static Data Area 313 from that of Procedure 311 containing the call instruction or a return instruction terminates an execution of a Procedure 311' which uses a Static Data Area 313 different from that of Procedure 311. PBP changes whenever a call instruction specifies a Procedure 311' which does not have the same PBP as Procedure 311 or a return instruction terminates an execution of a Procedure 311' which does not have the same PBP as that of Procedure 311. NTP, finally, changes whenever a call instruction specifies a Procedure 311' which uses a Name Table 309 different from that used by Procedure 311 or a return instruction terminates an execution of a Procedure 311' which has a Name Table 309 different from that used by Procedure 311. For the most part, calls and returns in ICS 311 change only FP.

When Processor 303 is executing instructions in the execution of Procedure 311 represented by Top Frame 329, Base Registers 331 in Descriptor Processor 329 contain FP, SDP, and PBP. Another register, Name Table Register 332, contains NTP. The values in these registers change only as a consequence of the execution of a call instruction or a return instruction. On execution of a call instruction, Processor 303 places the values of those addresses in these registers whose values change as a consequence of the call instruction in Return Area 316 of Top Frame 321 created by execution of the call instruction, calculates new values for the architectural base addresses as required for called Procedure 311', and sets the registers to these new values. On execution of a return instruction, Processor 303 sets Base Registers 331 and Name Table Register 332 to the values saved in Return Area 316 of Top Frame 321.

1.2.2 Base-Displacement Addressing using Architectural Base Addresses

ICS 301 employs two different methods of calculating addresses using architectural base registers. In direct base-displacement addressing, the architectural base address is the base address and a displacement is calculated and added to it in order to obtain the address of the data.

In indirect base-displacement addressing, the base address is not an architectural base address, but instead a pointer located at a displacement from one of the architectural base addresses. Descriptor Processor 329 first calculates the address of the pointer which is the base address as described above for direct base-displacement addressing and then calculates the address of the data by adding a displacement to the address specified by the pointer.

1.3 Operands in ICS 301—FIG. 4

Operands in ICS 301 are termed Names. A Name may itself specify a base address and a displacement, or it may specify a NTE 310 which specifies the base address and the displacement. FIG. 4 presents an overview of those features of Names 401 and Name Table Entry 310 required for understanding the present invention; a detailed discussion of Names and Name Table Entries in ICS 301 may be found in U.S. patent application Ser. No. 301,999.

1.3.1 Names 401 in ICS 301

There are two kinds of Names 401 in ICS 301, Table Names 403, which specify a NTE 310, and Immediate Names 409, which directly specify an architectural base address and a displacement. Both kinds of Name 401 contain NTY Field 405, which contains codes specifying whether Name 401 is a Table Name 403 or an Immediate Name 409, and if it is the latter, which architectural base address is to be used in calculating the address. Table Names 403 have one other field, NT_IND 407, which is the index of NTE 310 corresponding to Table Name 403 in Name Table 309. The address of NTE 310 corresponding to Table Name 403 is calculated by adding the value of NT_IND Field 407 to the value of NTP. Immediate Names 409 have two other fields: DISP Field 413 and IB Field 411. DISP Field 413 specifies a displacement from the architectural base address indicated by NTY 405. IB Field 411 indicates whether the data item at the address obtained by adding the specified displacement to the specified architectural base address is a pointer to the data item represented by Immediate Name 409 or the data item itself.

In a present embodiment of ICS 301, Names 401 contain 16 bits. NTY Field 405 contains a two-bit code with the following meanings:

| Code | Meaning |
| --- | --- |
| 00 | Immediate Name; Base = FP |
| 01 | Immediate Name; Base = SDP |
| 10 | Immediate Name; Base = PBP |
| 11 | Table Name |

In Table Names 403, the remaining 14 bits make up NT_IND Field 407. In Immediate Names 409, the remaining 14 bits contain IB Field 411, a reserved bit, and a twelve-bit DISP Field 413. In a present embodiment of ICS 301, DISP Field 413 contains a signed integer represented in twos complement notation. When multiplied by 32 (i.e., shifted left five places), the value in DISP Field 413 yields the displacement. Other information required to form a descriptor from an Immediate Name 409 is derived from the context in which Immediate Name 409 appears. In other embodiments of ICS 301, Names 401 may have different lengths and employ other means of specifying a base address and a displacement.

1.3.2 NTEs 310 in ICS 301

Name Table Entry 310 as represented in FIG. 4 is a schematic representation of the four kinds of information which may be contained in a NTE 310 of the present embodiment:

* Entry Interpretation Information (EII) 417 specifies how a descriptor is to be derived from the information contained in NTE 310.
* Base Information (BI) 419 is information from which the base address used to calculate the descriptor's address may be derived.
* Displacement Information (DISPI) 421 is information from which the displacement used to calculate the descriptor's address may be derived.
* Descriptor Information (DESCI) 423 is information from which other information required for the descriptor may be calculated or obtained.

BI 419, DISPI 421, and DESCI 423 may contain constants or Names 401 or combinations thereof. For example, in a NTE 310 for an element of an array, BI 419 specifies the address of the array. It may do so by specifying an architectural base address and a displacement which yield the address, by specifying an architectural base address and a displacement which yield a the address of a pointer to the array, by means of an Immediate Name 409 which yields the base address, or by means of a Table Name 403 referring to a NTE 310 in the same Name Table 309. That NTE 310 contains information which yields the address of the array. DISPI 421 in an NTE 310 for an array element may contain a constant value specifying the size of the array element and a Name 401 which yields a descriptor for data whose value is the array element's index. DESCI 421 may contain a constant specifying the length, or it may contain a Name 401 which yields a descriptor for data whose value is the length.

1.4 Name Resolution in ICS 301

Name resolution is the operation performed by Descriptor Processor 329 when it derives a descriptor for a data item represented by a Name 401 from the Name 401 using the architectural base addresses contained in Base Registers 331, pointers, and in the case of a Table Name 403, the NTE 310 for Table Name 403 and NTEs 310 for any Table Names 403 contained in that NTE 310.

In the case of an Immediate Name 409 which directly specifies a base and a displacement, Descriptor Processor 329 resolves Immediate Name 409 by adding the displacement specified in DISP Field 413 to contents of the register in Base Registers 331 which contains the architectural base address specified by NTY Field 405.

In the case of an Immediate Name 409' whose IB Field 411 indicates that the base is being specified indirectly, Descriptor Processor 329 obtains the address of the data specified by Immediate Name 409' by adding the displacement specified in DISP Field to the architectural base address as specified above to obtain an address and then fetching the pointer at that address from Memory 305. The pointer is then used to construct the descriptor.

In the case of Table Names 403, Descriptor Processor 329 adds the value of NT_IND Field 407 to the value in Name Table Register 332 to obtain the address of NTE 310 corresponding to Table Name 403, fetches NTE 310 from Memory 305, and then derives the address of the data item represented by Table Name 403 from the information contained in NTE 310 in the manner prescribed by EII Field 417 and the contents of NTE 310. If NTE 310 contains Immediate Names 409 or Tables Names 403, they are resolved as just described.

2 Encachement of Addresses in ICS 301

In the following, the properties of addresses in ICS 301 which make them encacheable are described and an overview is presented of improved cache apparatus used for encaching addresses in a present embodiment of ICS 301.

2.1 Encacheable Addresses

In prior art computer systems in which the base addresses were obtained from general purpose registers, addresses obtained by adding a constant displacement to a base address could not be encached in caches responsive to operands because the values of the base registers could change at arbitrary times and in an arbitrary manner. In ICS 301, such addresses may be may be encached in caches responsive to Names 401 because the architectural base addresses and NTP change their values only on execution of a call instruction or a return instruction. The addresses in the cache therefore remain valid for at least the period between execution of a call instruction or a return instruction and the execution of another call instruction or return instruction. Addresses which remain valid for that period are termed herein encacheable addresses.

Encacheable addresses are produced in the course of each name resolution operation. In some cases, the address of the data represented by Name 401 is encacheable; encacheable; in others, that address is not encacheable, but intermediate addresses used to determine that address are.

There are two cases in which the address of the data represented by Name 401 is encacheable:
 *When Immediate Name 409 or NTE 310 for a Table Name 403 specifies an architectural base address and a constant displacement.
 *When Immediate Name 419 or NTE 310 specifies a constant displacement and a base address which is a pointer at a negative displacement from FP or SDP.

In the latter case, addresses calculated by adding constant displacements to the pointers are encacheable because the pointers do not change their values for the life of Static Data Area 313 or Frame 319 containing them and FP and SDP change only on execution of a call or return instruction.

In all other cases, only intermediate addresses are encacheable. For example, if an Immediate Name 409 specifies a pointer as a base address and the pointer is at a positive displacement from FP or SDP, the pointer's value may change. Consequently, addresses derived from the pointer are not encacheable. However, the pointer is at a constant displacement from an architectural base address, and consequently, the pointer's address is encacheable. Once the pointer's address is encached, Descriptor Processor 329 can resolve Immediate Name 409 by fetching the pointer at the location specified by the encached address from Memory 305 and adding the displacement to it to produce the address specified by Immediate Name 409.

2.2 Cache Apparatus for Encacheable Addresses

In order to take full advantage of encacheable addresses, a present embodiment of ICS 301 employs special cache apparatus. The following discussion first describes the limitations of prior-art cache apparatus when it is used for encacheable addresses and then describes cache apparatus particularly adapted to use with encacheable addresses or in other situations in which encached values are dependent on other values which are not subject to arbitrary change.

2.2.1 Prior-Art Cache Apparatus in ICS 301

The utility or prior-art cache apparatus in embodiments of ICS 301 is limited by two facts:
 *Encacheable addresses depend either directly or indirectly on values of FP, PBP, SDP, and NTP, and these values are subject to change on execution of any call or return instruction.
 *In modern programming practice, large programs are constructed from a great many short procedures and call and return instructions occur frequently.

In prior art cache apparatus, a cache entry accessed by a key is either invalid or contains completely-calculated addresses; consequently, when a value used to calculate the address changes, the entry accessed by the key must be invalidated. Thus, when prior art cache apparatus contains encacheable addresses, all cache entries containing encacheable addresses derived from FP must be invalidated each time a call or return instruction is executed and cache entries containing encacheable addresses derived from PBP or SDP must be invalidated whenever a call instruction or a return instruction changes those values. However, it is impossible to tell from an encached address which of Base Registers 331 was employed in producing it, and further, it is impossible to tell from a Table Name 403 what Base Registers 331 are specified by its NTE 310. Consequently, when encacheable addresses are encached in prior-art cache apparatus, it is necessary to invalidate all cache entries whenever a call instruction or a return instruction is executed. Since these instructions occur with high frequency in programs executed by ICS 301, the cache entries in prior art cache apparatus are generally invalid and most of the benefits of encachement are lost.

2.2.2 Improved Address Caches in ICS 301—FIG. 5

FIG. 5 provides a conceptual representation of Improved Address Caches 501 employed in a present embodiment of ICS 301. In FIG. 5, solid arrows represent inputs to or outputs from Improved Address Caches 501 and dotted arrows represent control signals. Improved Address Caches 501 take advantage of three properties of base-displacement addressing in ICS 301:
- *In encacheable addresses, the displacement is constant and only the base address is affected by the execution of call instructions and return instructions. The relationship between a Name 401 and a constant displacement remains unchanged as long as Name Table 309 continues to be used. When a new Name Table 309 replaces the former Name Table 309, NTP changes its value. Thus, encached displacements need not be invalidated unless the execution of a call instruction or a return instruction changes the value of NTP.
- *Addresses derived from argument pointers and linkage pointers are encacheable during the life of Frame 319 or Static Data Area 313 which contains them.
- *Argument pointers in a given Frame 319 serve as base addresses only when FP specifies that Frame 319, and linkage pointers in given Static Data Area 313 are used in ICS 301 only when SDP specifies that Static Data Area 313.

The improved address caches of the present embodiment of ICS 301 take advantage of the first property by encaching encacheable base addresses separately from the constant displacement values and then adding the encached displacement to the encached base address to produce the base-displacement address. The displacements are contained in Raw Materials Name Cache (RMNC) 517, which employs Table Names 403 as keys. RMNC 517 is so termed because it contains raw materials from which addresses may be formed.

The base addresses are contained in two base address caches. One, Architectural Base Register Cache (ABRC) 504, contains the current values of FP, SDP, and PBP. The other, Argument Base Cache (ABC) 502, contains base addresses derived from argument pointers contained in Frames 319. ABC 502 employs Immediate Names 409 representing argument pointers as keys. As previously explained, these Immediate Names 409 specify only argument pointers in Top Frame 321. In response to these Immediate Names 409, ABC 501 produces addresses derived from the argument pointers specified by these Immediate Names 409. Codes associated with the displacements in RMNC 517 specify which of the base address caches contains the base address to be combined with the displacement. When the code specifies an argument pointer as a base address, the displacement is further associated with a key to which ABC 501 responds in the same fashion in which it responds to an Immediate Name 409.

The improved address caches take advantage of the second and third properties as follows: First, since SDP changes much less frequently than FP and linkage pointers never change their values, complete addresses derived from linkage pointers are encached along with the displacements in RMNC 517. RMNC 517 is consequently completely invalidated each time SDP, PBP, or NTP changes. Second, since argument pointers never change their values, ABC 502 contains not only argument pointers from Top Frame 321, but also argument pointers from Frames 319 below Top Frame 321. It thus need not be invalidated on execution of every return instruction.

2.3 Overview of Improved Address Caches 501 in ICS 301

Turning now to a more detailed consideration of FIG. 5, there is first described the relationship of Improved Address Caches 501 to ICS 301, and then the structure and operation of Improved Adress Caches 501 are described.

2.3.1 Relationship of Improved Address Caches 501 to ICS 301

Improved Address Caches 501 are contained in Descriptor Processor 329 of ICS 301. Improved Address Caches 501 receive Names 401 via Name Bus 328. Names of Fields in Names 401 appear as labels on inputs to components of Improved Address Caches 501 in FIG. 5 to indicate which portions of a Name 401 is received by that component. Improved Address Caches 501 provides addresses and other data to Descriptor Processor 329 via Descriptor Bus 333. Cache Loading Bus 527 internal to Descriptor Processor 329 allows caches in Improved Address Caches 501 to be loaded with data items from Memory 305 and with values produced by Descriptor Processor 29. Improved Address Caches 501 operate under control of Control 327 and of signals produced by CTL 515 in response to Names 401, hit signals from ABC 502 and RMNC 517, and codes contained in RMNCEs 519. Microinstruction sequences are executed in turn by Control 327 in response to signals from CTL 515 and codes contained in RMNCEs 519.

2.3.2 Components of Improved Address Caches 501

The main components of Improved Address Caches 501 are the following:
- *ABC 502, which has two main components: ABC Addressing Logic 533 and ABC Registers 504. ABC Registers 504 contain ABC Entries (ABCEs) 503 in which are stored base addresses derived from argument pointers contained in Stack 317. ABC Addressing Logic 533 derives addresses in ABC Registers 504 from keys received from either Name Bus 328 or RMNC 517. ABC 502 responds to the keys by outputting base addresses to Base Mux 511 and ABC Hit/Miss Signals to CTL 515. ABC Addressing Logic 533 may also output the address of ABC Entry 503 which was last addressed to Descriptor Bus 333.
- *ABRC 504, which contains three registers: FPR 505, containing the current value of FP, SDPR 507, containing the current value of SDP, and PBPR 509 containing the current value of PBP.
- *RMNC 517, which contains RMNC Entries (RMNCEs) 519 and responds to keys from Name Bus 328. RMNCEs 519 may contain constant values used to calculate displacements or complete addresses derived from linkage pointers. RMNC 517 outputs a RMNC Hit/Miss Signal to CTL 515, and on a hit, data from a RMNCE 519 corresponding to a key may be output directly to Descriptor Bus 333, or parts of a RMNCE 519 may be output to Displacement Mux 525, CTL 515, ABC 502, and Control 327.
- *Name Trap 513, which contains the value of the last Name 401 input to Improved Address Caches 501;
- *Address Adder 513, which adds base addresses received from Base Mux 511 and displacements received from Displacement Mux 525 or passes either a base or a displacement through unchanged.
- *Base Mux 511, which selects the a base address output by ABC 502 or one of Registers 505 through 509 from ABRC 504.
- *Displacement Mux 525, which selects a displacement value from the Displacement Field of an RMNC 519 or from Name Bus 328.

*CTL 515, which receives inputs from Name Bus 328, the RMNCE 519 specified by a key, RMNC 517, and ABC 512 and responds to those inputs by producing control signals for Base Mux 511, Displacement Mux 525, Address Adder 513, and Control 327.

2.3.3 Operation of Improved Address Caches 501

In general terms, Improved Address Caches 501 operate as follows: when a Name 401 appears on Name Bus 328, CTL 515 receives NTY Field 405, IB Field 411, and certain bits of DISP Field 413. CTL 515 CTL 515 determines from the values of these fields which of the following classes a Name 401 belongs to:

*Immediate Names 409 specifying an architectural base register as a base.
*Immediate Names 409 specifying an argument pointer as a base.
*Immediate Names 409 specifying a writable pointer as a base.
*Table Names 403.

The discussion deals first with the operation of Improved Address Caches 501 in response to Immediate Names 409 and then with its operation in response to Table Names 403.

2.3.3.1 Operation of Improved Address Caches 501 in Response to Immediate Names 409

In the case of an Immediate Name 409 specifying an architectural base register as a base, CTL 515 responds to NTY Field 405 of Immediate Name 409 by causing Base Mux 511 to select the register in ABRC 504 containing the current value of the architectural base address specified in the Immediate Name and Displacement Mux 525 to select DISP Field 413 of Immediate Name 409. Address Adder 513 then adds the value from the specified register in ABRC 504 to the value from DISP Field 413 to produce the address specified by Immediate Name 409. In the present embodiment of ICS 301, Disp Mux 525 also converts DISP Field 413 to a 32-bit value. It does so by shifting DISP Field 413 5 places to the left and sign extending the resulting value to 32 bits.

In the case of an Immediate Name 409 specifying an argument pointer, if the address specified by the argument pointer is encached in ABC 502, CTL 515 receives a hit signal from ABC 502 and responds to the hit signal and the NTY, IB, and DISP Fields of Immediate Name 409 by causing Base Mux 511 to select ABC 502 and Address Adder 513 to pass the value received from Base Mux 511 through unchanged to Descriptor Bus 333.

In the case of an Immediate Name 409 specifying a writable pointer as a base, i.e., a pointer at a positive displacement from SDP or FP, the writable pointer cannot be encached. CTL 515 detects the positive value of DISP Field 413 and produces a signal to Control 327. The microcode sequence executed by Control 327 in response to the signal retrieves Immediate Name 409 from Name Trap 531, uses the architectural base address specified by NTY Field 405 and the value of DISP Field 413 to form the address of the pointer, and then fetches the pointer from Memory 305 and converts it to a descriptor for the data represented by Immediate Name 409.

2.3.3.2 Operation of Improved Address Caches 501 in Response to Table Names 403

In the case of Table Names 403, the behavior of Improved Address Caches 501 depends on codes contained in RMNCE 519 accessed by Table Name 403. When there is an RMNCE 519 corresponding to a Table Name 403 and Table Name 403 is presented to RMNC 517, the code in RMNCE 519 corresponding to Table Name 403 is output to CTL 515. The code then determines the manner in which Improved Address Caches 501 responds to Table Name 403. The code contained in an RMNCE 519 is set by the microinstruction sequence which loads the RMNCE 519.

The simplest case is a RMNCE 519 for a Table Name 403 representing a linkage pointer. Addresses derived from linkage pointers are completely encached in RMNCE 519, so CTL 515 responds to the code specifying such an RMNCE 519 by causing DISP Mux 525 to select RMNC 517 and causing Address Adder 513 to pass the input from DISP Mux 525 through unchanged to Descriptor Bus 333.

If RMNCE 519 contains a constant displacement which is added to one of the architectural base addresses to produce the desired address, the code further specifies which base address is to be used to produce the address. CTL 515 responds to the code specifying this type of entry by causing Base Mux 511 to select the register of ABRC 504 containing the specified base address and Disp Mux 525 to select the RMNC. Address Adder 513 then adds the base address and the displacement to produce the address represented by the name.

When RMNCE 519 contains a constant displacement which is added to a base specified by an argument pointer to produce the address, RMNCE 519 also contains a value equivalent to the DISP Field of an Immediate Name 413. This value is output to ABC 502. When a Table Name 403 appears on Name Bus 328, ABC 50 selects RMNCE 519 as its input and outputs the value of ABCE 503 corresponding to the value received from RMNCE 519. As with other types of RMNCE 519, the code specifying the type of RMNCE 519 is output to CTL 515, which responds by causing Base Mux 511 to select ABC 502 and Displacement Mux 525 to select RMNC 517. As a result, Address Adder 513 adds the constant displacement value encached in the RMNCE 519 to the address produced by ABC 502 in response to the value it received from the RMNCE 519.

In more complex cases, RMNCE 517 contains information from which addresses of microinstruction sequences may be derived. This information is output to Control 327, which responds by executing the microinstruction sequence specified by RMNCE 517. The specified microinstruction sequence uses the contents of RMNC 517 corresponding to Table Name 403 to construct the address represented by Table Name 403. For example, if the displacement of the address represented by Table Name 403 is calculated using data contained in Memory 305, RMNC Entry 519 corresponding to Table Name 403 may itself contain a Table Name 403' representing the data, and the microinstruction sequence selected by CTL 327 may calculate the displacement by providing Table Name 403' to RMNC 517 to obtain the address of the data, fetching the data from Memory 305, and using the data to calculate the displacement.

As described above, if there is no valid ABCE 503 corresponding to a key received from Name Bus 328 or RMNC 517, CTL 515 receives a miss signal from ABC 502. CTL 515 responds to the miss signal by providing a signal to Control 327 to which Control 327 responds by executing an ABC miss microinstruction sequence. Under control of this microinstruction sequence, Descriptor Processor 329 obtains the address of the invalid ABCE 503 from ABC Addressing Logic 533 via Descriptor Bus 333, uses the address to form Immediate Name 409 which caused the miss, uses Immediate Name 409 to locate the argument pointer represented by Immediate Name 409 in Top Frame 321, and then uses the address to load the argument pointer into the proper location in ABC 502. Thereupon, the operation which caused the miss is repeated.

Similarly, if there is no valid RMNCE 519 corresponding to a Table Name 403, CTL 515 receives a miss signal from RMNC 517 and produces a signal to which Control 327 responds by executing an RMNC miss microinstruction sequence. Under control of this microinstruction sequence, Descriptor Processor 329 retrieves Table Name 403 which caused the miss from Name Trap 531, fetches NTE 310 corresponding to Table Name 403 from Memory 103, uses Table Name 403 to locate the corresponding RMNC Entry 519 and makes a RMNCE 519 using the data contained in NTE 310. Once RMNC Entry 519 corresponding to Table Name 403 is loaded, the operation which caused the miss is repeated.

2.4 Invalidation in Improved Address Caches 501

In Improved Address Caches 501, FPR 505 must be updated on every execution of a call or return instruction, and SDPR 507 and PBPR 509 must be updated whenever the execution of a call or return instruction requires that they be changed.

In ABC 502, complete invalidation is not required as long as ICS 301 uses the same Stack 317. On execution of a call instruction, addresses corresponding to the argument pointers placed in Top Frame 321 must be loaded into ABC 502, but argument pointers in previous Frames 319 do not change their values, and there is therefore no need to invalidate the ABCEs 503 which contain them. Since argument pointers from previous Frames 319 are retained in ABC 503, the return instruction need only invalidate ABCEs 503 containing argument pointers from the previous Top Frame 321.

In RMNC 517, complete invalidation is required only when execution of a call or return instruction changes the value of SDP, PBP, or NTP, or when ICS 301 requires a new Stack 317. Complete addresses in RMNCEs 519 are never derived from FP, and therefore do not become invalid when FP changes. RMNCEs 519 containing only displacements become invalid only when a call or return instruction invokes or returns to a Procedure 311 having a different Name Table 309 from that of Procedure 311 containing the call or return instruction or when ICS 301 executes a program which uses a different Stack 317. Calls and returns which change only FP are far more frequent than other calls and returns, and calls or returns which change more than FP frequently change more than one of PBP, SDP, or NTP. Consequently, in a present embodiment of ICS 301, RMNC 517 is invalidated whenever ICS 301 executes a program which uses a different Stack 317 or a call or return involves more than a change in the value of FP. In other embodiments, RMNC 517 may not contain complete addresses, and in such embodiments, RMNC 517 need only be invalidated when a call or return instruction requires a different Name Table 309 or when ICS 301 executes a program which uses a different Stack 317.

Other embodiments of Improved Address Caches 501 may include separate caches for encacheable pointers other than argument pointers. Such caches might be connected to Base Mux 511 along with ABC 502 and ABRC 504 and might receive keys from name Bus 328 or RMNC 517 in the same fashion as ABC 502. Codes in RMNCEs 510 might also select such additional caches as the sources of base addresses.

2.5 Detailed Logical Structure of ABC 502 and RMNC 517—FIGS. 6 and 6A

The discussion now turns to the detailed logical structure of ABC 502, represented by FIG. 6, and that of RMNC 517, represented by FIG. 6A.

2.5.1 Detailed Logical Structure of ABC 502—FIG. 6

FIG. 6 presents the detailed logical structure of ABC 502 and illustrates the relationship between ABC 502 and Stack 317. FIG. 6 includes a representation of the contents of ABC 502, ABC Contents 613, a detailed representation of Current ABC Frame 607 in Current ABC Frame Detail 615, and a representation of Stack 317.

Turning first to ABC Contents 613, ABC 502 is made up of ABC Frames 603. Each ABC Frame contains a number of ABCEs 503. In a present embodiment of ABC 502, there are 16 ABC Frames 603, and each ABC Frame 603 contains 16 ABCEs 503. The number of ABC Frames 603 in ABC 502 and number of ABCEs 503 in a register may be different in other embodiments, and in some embodiments, the number of ABC Frames 603 and the number of ABCEs 503 in an ABC Frame 603 may not be fixed. Each ABCE 503 contains two separately-loadable fields: Address Field 609, which may contains an address derived from an argument pointer when ABCE 503 is valid, and Validity (V) Field 611, which specifies whether ABCE 503 is valid. When all ABCEs 503 making up an ABC Frame 603 are invalid, that ABC Frame 603 is invalid.

Each valid ABC Frame 603 corresponds to a Frame 319 in Stack 317. Current ABC Frame 607 corresponds to Top Frame 321 and ABC Frames 603 below Current ABC Frame 607 correspond to Frames 319 below Top Frame 321. Thus, in FIG. 6, ABC Frame 603 (4) corresponds to Frame 319 (1), ABC Frame 603 (3) to Frame 319 (2), and so forth. Within an ABC Frame 603, addresses specified by argument pointers in Frame 319 corresponding to ABC Frame 603 are arranged in an order corresponding to that of Argument Pointers 601 in Frame 319. In Current ABC Frame Detail 615, Argument Pointers 601 in Top Frame 321 are in the order 601 (0), 601 (1), and 601 (2), and in Current ABC Frame 607, ABCEs 503 containing addresses from these Argument Pointers 601 are in the same order. However, any corresponding order, for example, one which is the reverse of the order in Frame 319, is possible.

ABCEs 503 not containing addresses are invalid, and if a Frame 319 contains more than 16 Argument Pointers 601, only addresses from the first 16 are encached in ABC Frame 603. CTL 515 detects Immediate Names 409 specifying Argument Pointers 601 which cannot be encached in ABC 502 from the value of DISP Field 413 and responds to such Immediate Names 409 by causing Control 327 to execute microcode similar to that described in the discussion of Immediate Names 409 specifying writable pointers as base addresses. Next ABC Frame 605, above Current ABC Frame 607, is always invalid. Thus, in the present embodiment, ABC 502 may contain addresses from argument pointers in only the top 15 Frames 319 of Stack 321. The stack in ABC 502 wraps around; that is, if ABC Frame 603 (0) corresponds to Frame 319 (a), then ABC Frame 603 (15) corresponds to Frame 319 (a+1).

When Processor 303 executes a call instruction, addresses corresponding to Argument Pointers 601 for the arguments used in the call instruction are loaded into Next ABC Frame 605. Then, Next ABC Frame 605 becomes the new Current ABC Frame 607 and ABC Frame 603 above new Current ABC Frame 607 is invalidated, making it the new Next ABC Frame 605. On execution of a return instruction, ABC Frame 603 below Current ABC Frame 607 becomes the new Current ABC Frame 607, and the former Current ABC Frame 607 is invalidated, making it the new Next ABC Frame 605. Thus, Current ABC Frame 607 always corresponds to Top Frame 321.

As previously mentioned, DISP Field 413 of Immediate Names 409 specifying Argument Pointers 601 as bases are used as keys for ABC 502. All Argument Pointers 601 which may be specified by DISP Field 413 are contained in Top Frame 321 corresponding to Current ABC Frame 607, and consequently, only Current ABC Frame 607 responds to the keys. Since the value of DISP Field 413 depends on the location of Argument Pointer 601 in Top Frame 312 and the order of Addresses in an ABC Frame 603 corresponds to that of Argument Pointers 601 in Frame 319 corresponding to ABC Frame 603, DISP Field 413 may be used to directly address ABCEs 503 within Current ABC Frame 607. If ABCE 503 addressed by DISP Field 413 is valid, it contains the address from Argument Pointer 601 specified by Immediate Name 409.

In a present embodiment of ICS 301, only bits 8–11 of DISP Field 413 are used as keys to ABC 502. The less-significant bits of DISP Field 413 are not required because Argument Pointers 601 in ICS 301 are stored at negative displacements from FP which are evenly divisible by 128. In the two's complement notation employed in DISP Field 413, displacements of Argument Pointers 701 have 0's in their seven least-significant digits. Bit 12 of DISP Field 413 is not required, since an ABC Frame 603 in Preferred Embodiment 701 can hold no more than 16 Argument Pointers 601.

If ABCE 503 specified by DISP Field 413 is valid, ABC 502 signals a hit to CTL 515; if it is not, ABC 502 signals a miss and CTL 515 produces a signal to which Control 327 responds by executing an ABC miss microcode sequence code which uses the value of DISP Field 413 to reconstruct Immediate Name 409 which caused the miss, uses that Immediate Name 409 to locate Argument Pointer 601 represented by Immediate Name 409, and loads the address derived from Argument Pointer 601 into the proper ABCE 503 in Current ABC Frame 607. Since addresses are loaded into Current ABC Frame 607 on execution of a call instruction, such misses occur only when, as a result of return instruction, an invalid ABC Frame 603 has become Current ABC Frame 607 or when some operation of Processor 303 has required invalidation of all ABC Frames 603.

2.5.2 Logical Structure of RMNC 519—FIG. 6A

RMNC 519 contains a plurality of RMNCEs 519. The logical form of RMNCE 519 in a preferred embodiment of the present invention is presented in FIG. 6A. Each RMNCE 519 consists of four RMNCE Registers 627, specified herein by RMNCER 627 (0 . . . 3) In addition, a set of Control Fields 620 is associated with RMNCER 627 (0) of each RMNCE 519. A valid RMNCE 519 corresponds to a single NTE 310 in Name Table 309 being used by Procedure 311 being executed by Processor 303. The valid RMNCE 519 is accessed in RMNC 519 by Table Name 403 specifying NTE 310 to which valid RMNCE 519 corresponds. An address may be produced from the data contained in a valid RMNCE 519 in two ways: directly from the data in RMNCER 627 (0), and by means of microcode intervention from data stored in any RMNCER 627.

2.5.2.1 Direct Production of Addresses from RMNCER 627 (0)

When an address is obtained directly from RMNCER 627 (0), different fields of RMNCER 627 (0) and Control Fields 620 go to different parts of Improved Address Caches 501. The fields and their destinations are the following:

*Displacement Field 629, which is output directly to Displacement Mux 525.

*Base Field 641, which is output to CTL 515. Base Field 641 includes two sub-fields:
  (a) BS Field 635, which contains a value specifying the ABR, if any, to be used in forming the address.
  (b) @ Field 635, which specifies that the base is a pointer.

*ADISP Field 639, which contains bits 8–11 of DISP Field belonging to an Immediate Name 409 representing an Argument Pointer 601 in NTE 310 corresponding to RMNCE 519. ADISP Field 639 is output to ABC 502, and if Base Field 641 so specifies, the address contained in ABCE 503 corresponding to ADISP Field 639 is used as the base address.

Control Fields 620 control the manner in which Improved Address Caches 501 process the information in RMNCE 519 under control of CTL 515 or microinstructions executed by Control 327. The subfields are the following:

*ABCF Field 621 indicates whether Name 401 corresponding to RMNCE 519 is resolved using ABC 502 as well as RMNC 517. ABCF Field 621 is output to CTL 515.

*V Field 622 indicates whether RMNCE 519 is valid and is output to CTL 515.

*ID Field 623 contains data from which Control 327 locates a microinstruction sequence for processing the contents of RMNCE 519 to which ID Field 623 belongs. ID FIeld 623 is output to Control 327.

*BC Field 625 contains a copy of Base Field 641 in RMNCER 627 (0) and is output to CTL 515. CTL 515 responds to BC Field 625 by choosing destinations for the output from RMNCER 627(0) as required by RMNCER 627(0)'s contents.

FIG. 6A includes Example RMNCER 627 (0) and its associated Control Fields 620. Example RMNCER 627 (0) corresponds to a NTE 310 specifying an address at a constant displacement from an Argument Pointer 601. Displacement Field 629 contains the value of the constant displacement, BS Field 635 contains the code 00, specifying FP, @ Field 637 contains the value 1, specifying an indirect reference, and ADISP Field 639 contains a negative value specifying the displacement of Argument Pointer 601 from FP. In Control Fields 620, ABCF 621 specifies that ABC 502 will provide the base address, V Field 622 that the entry is valid, and ID Field 623 that no microcode intervention is required. BC Field 625 contains a copy of Base Field 641.

When a Table Name 403 corresponding to RMNCER 627 is input to RMNC 517, the following happens: ABCF Field 621 and BC Field 625 are output to CTL 515, ADISP Field 639 is output to ABC 502, and Displacement Field 629 is output to Displacement Mux 525. ABC 502 outputs an address in response to ADISP FIeld 639, CTL responds to BC Field 525 by causing Base Mux 511 to select ABC 502 as its input, and Address Adder 513 adds the value of Displacement Field 629 to the base address output by ABC 502. In response to other codes in BC Field 625, CTL 515 may select one of Registers 505 through 509 in ABRC 504 as the input to Base Mux 511 and Displacement Field 629 as the input to Displacement Mux 525 or may cause Address Adder 513 to pass a value from either mux through unchanged.

2.5.2.2 Production of Addresses from RMNCE 519 with Microcode Intervention

Microinstruction sequences executed by Control 327 in response to codes in ID 623 may use the contents of any RMNCER 627 in a RMNCE 517 corresponding to Table Name 403 currently on Name Bus 328 in two ways: by inputting it to the devices of Improved Address Caches 501 and by outputting it directly to Descriptor Bus 333. In the first case, RMNCER 627 contains Displacement Field 629, Base Field 641, and ADISP Field 639. The code in Base Field 641 is output to CTL 515 and determines how the devices of Improved Address Caches 501 process the contents of RMNCER 627. For example, a RMNCER 627 with fields set in the same fashion as in Example RMNCER 627 (0) 643 would be processed in the same manner. In the second case, RMNCER 627 is treated as a single field which is output directly to Descriptor Bus 333.

3 Detailed Description of a Preferred Embodiment of Improved Address Caches 501

In the following, there are presented detailed descriptions of preferred embodiments of all components of Improved Address Caches 501.

3.1 Description of a Preferred Embodiment of CTL 515

CTL 515 consists of standard logic gates. The manner in which CTL 515 responds to inputs from Name Bus 328, RMNC 517, and ABC 502 has already been described. The technique of combining standard logic gates to obtain the described functions is well-known to those skilled in the art, and CTL 515 is therefore not further described herein.

3.2 Description of a Preferred Embodiment of ABRC 504

In a preferred embodiment of ABRC 504, FPR 505, SDPR 507, and PBPR 509 may each consist of four eight-bit tristate D flip flops of type 74S374. Inputs to each of Registers 505 through 509 are from Cache Loading Bus 527 and outputs are to Base Mux 511. Registers 505 through 509 are always read enabled. They are write enabled under microcode control. FPR 505 is set to FP for new Top Frame 321 by microcode sequences executed in response to all call and return instructions; when PBP or SDP changes as a consequence of a call instruction or a return instruction, microcode sequences executed in response to those call and return instructions reset SDPR 507 and PBPR 509. In other embodiments, ABRC 504 may be implemented by means of a RAM containing Registers 505 through 509 and a single connection between Base Mux 511 and ABRC 504. The use of separate flip flops for Registers 505 through 509 and separate connections between the flip flops and Base Mux 511 makes it possible to permanently enable all Registers 505 through 509 for reading and thereby eliminate the delay caused by the need to address a single register of a RAM.

3.3 Detailed Description of Base Mux 511 and Displacement Mux 525

A preferred embodiment of Base Mux 511 may consist of 16 dual 4 to 1 line multiplexers of type 74S153. Each multiplexer receives two-bit inputs from ABC 502, FPR 505, SDPR 507, and PBPR 509 and provides a two-bit output to Address Adder 513.

A preferred embodiment of Displacement Mux 525 may consist of 8 quad 2-to-1 line multiplexers of type 74S258. Each multiplexer receives 4 bits of input from RMNCERs 627 and four bits of input consisting of bits from Name Bus 328 and bits which are always set to 0. Each multiplexer outputs four bits of whatever input is selected, or if neither input is selected, it outputs 0.

In the present embodiment, Displacement Mux 525 receives an input from Name Bux 328 only when an Immediate Name 409 is on Name Bus 328. In that case, the input is DISP Field 413, and Displacement Mux 525 produces a 32-bit displacement by effectively shifting DISP Field 413 5 bits to the left and sign extending it 15 bits to the left. The shift operation is a consequence of the manner in which inputs from Name Bus 328 are provided to Displacement Mux 525. The sixteen most significant bits received by Displacement Mux 525 from Name Bus 328 are from bit 4 of Name Bus 328, which carries the most significant bit of DISP Field 413. The next 11 most significant bits are from bits 5 through 15 of Name Bus 328, which carry the remainder of DISP Field 413. The remaining 5 bits are received from grounded inputs, and thus always have the value 0.

3.4 Detailed Discussion of a Preferred Embodiment of Address Adder 513

Address Adder 513 is a 32-bit carry look ahead adder. The adder may consist of eight 4-bit ALUs of type 74S181 and three look ahead carry generators of type 74S182. In the present embodiment, the adder is always enabled to perform one of two functions: to pass the value received from Displacement Mux 525 unchanged onto Descriptor Bus 333 or to add the value received from Displacement Mux 525 to the value received from Base Mux 511. Since Displacement Mux 525 produces the value 0 if neither input is selected, Address Adder 513 can effectively pass the value received from either Base Mux 511 or Displacement Mux 525 through unaltered to Descriptor Bux 533.

3.5 Detailed Discussion of a Preferred Embodiment of ABC 502—FIGS. 7 and 7A

A Preferred Embodiment of ABC 502 is presented in FIGS. 7 and 7A. FIG. 7 contains Preferred Embodiment 701 of Addressing Logic 533, and FIG. 7A contains Preferred Embodiment 772 of ABC Registers 504. Turning to these figures, an overview of the components and operation of the Preferred Embodiment of ABC 502 is first provided, followed by a detailed discussion of its components and operations.

3.5.1 Inputs to Preferred Embodiment 701 of Addressing Logic 533

The behavior of the Preferred Embodiment of ABC 502 is controlled by inputs from two sources: microinstructions and Name Bus 328. As may be seen in FIG. 7, microcommands involving ABC 502 are received in Preferred Addressing Embodiment 701 by RRMREG Line 724 and by two decoders: MDA 702 and MDB 703. MDA 702 and MDB 703 have three bits of the microcommand as input and Lines 705 through 717 as output. Only one of Lines 705 through 715 is inactive at any given time; remaining Lines 705 through 715 are active. Which of Lines 705 through 715 is inactive is determined by the three bits of microcommand input to MDA 702 and MDB 703. In Preferred Addressing Embodiment 701, MDA 702 and MDB 703 are 8 to 1 decoders.

Control inputs from Name Bus 328 are derived from NTY Field 405 of Names 401. As previously described, codes in NTY Field 405 indicated whether a Name 401 is a Table Name 403 or an Immediate Name 409, and if it is an Immediate Name 409, whether its base is FP, SDP, or PBP.

3.5.2 Address Generation Components

Continuing with FIG. 7, the components belonging to Addressing Logic 533 include Next Frame Counter (NFC) 753, Current Frame Counter (CFC) 749, State Registers A (SA) 743 and B (SB) 735, Flush Counter (FLC) 729, I-Name Mux 718, Microinstruction Decoders A (MDA 702) and B (MDB 703), FA Mux 761, Flush Buffer (FB) 730, ABC Trap 770, and associated logic.

As previously described, ABC Cache 502 is divided into 16 ABC Frames 603, each containing 16 ABCEs 503. An address for a given ABCE 503 specifies both a frame and a register within a frame. In the Preferred Embodiment of ABC 502, addresses for ABCEs 503 are eight-bit values; of these eight bits, the four least-significant are the register address and the four most-significant are the frame address. The addresses are carried by address lines ADDR (0 . . . 7); frame address FRA 765 is carried by lines 0 . . . 3 of ADDR (0 . . . 7) and register address RA 767 is carried by lines 4 . . . 7 of ADDR (0 . . . 7).

FRA 765 and RA 767 are connected to data inputs DI of ABC Trap 770. ABC Trap 770 may be implemented by means of two 74S194 Shift Registers. ABC Trap 770 is write enabled whenever ABC 502 is resolving an Immediate Name 409, and as a consequence, the current value of ADDR (0 . . . 7) is latched into ABC Trap 770 on every resolve operation. ABC Trap 770 may be write enabled at other times by $\overline{\text{RABC}}$ Line 717. ABC Trap 770 is always read enabled and outputs ADDR (4 . . . 7) to Descriptor Processor 329. On a miss in ABC 502, the ABC miss microinstruction sequence uses the contents of ABC Trap 770 to form Immediate Name 409 which caused the miss.

3.5.2.1 Sources of RA 767

There are two sources of RA 767: when an entire ABC Frame 603 is being invalidated, the source of RA 767 is FLC 729; for all other operations, the source of RA 767 is I-name Mux 718.

Turning first to I-Name Mux 718, in Preferred Embodiment 701 of Addressing Logic 533, I-Name Mux 718 is a quad 2-to-1 line multiplexer such as the 74S258. I-Name Mux 718 is enabled when its E input is inactive. As will be explained in detail below, the E input is inactive except when an ABC Frame 603 is being invalidated or the entire ABC 501 and RMNC 517 are being invalidated. When I-Name Mux 718 is enabled, it selects inputs from Name Bus 328 according to the state of the S input. When the S input is active, I-Name Mux 718 selects inputs from ADISP 639; when it is inactive, I-Name Mux 718 selects inputs from Name Bux 328. Whether the S input is active is determined by the output of OR Gate 726. OR Gate 726 receives inputs from RRMREG Line 724 and AND Gate 725, and consequently, the S input is active when RRMREG Line 724 is active or when both inputs to AND Gate 725 are active. RRMREG Line 724 is activated in response to microinstructions; the inputs of AND Gate 725 are bits 0 and 1 of Name Bus 328, which carry NTY Field 405 of Names 401. When NTy Field 405 has the value 11, i.e., when Name 401 is a Table Name 403, I-Name Mux 718 selects its input from ADISP 639; otherwise, it selects the input from Name Bus 328.

The inputs from Name Bus 328 may be either bits 8-11 of DISP Field 413 from an Immediate Name 409 received from an instruction or they may be values provided by microcode. ADISP Field 639 is input from one of RMNCERs 627 (0 . . . 3) in RMNCE 519 specified by the value currently on Name Bus 328. Values in ADISP Field 639 consist of bits 8-11 of DISP Field 413 of Immediate Names 409 contained in NTEs 309.

The second source of RA 727 is FLC 729. FLC 729 may be a four-bit counter of the type 74S163. FLC 729 increments the value it contains when its P and T inputs are active and it receives a clock pulse on its CLK input. FLC 729's current value is output on lines 0 . . . 3. When FLC 729's L input is inactive, FLC 729 is reset to the value at its data inputs. As employed in Preferred Addressing Embodiment 701, FLC 729 has its inputs permanently set to 0. FLC 729 outputs its current value to FB 730, which may be a tri-state line driver-receiver of the type 74S244. FB 730 is enabled when its E input is inactive. As will be explained in more detail in the description of the flush operation, when an ABC Frame 603 is being invalidated, I-Name Mux 718 is disabled and FB 730 is enabled. FLC 729 counts, and FB 730 drives the values produced by FLC 729 onto RA 727. When FLC 729 is not counting, it outputs the binary value 8, i.e., data output line 3 is active and the other data output lines are inactive. FLC 729's operation is controlled by SA Register 743 and SB Register 735; both registers contain the value 0 except during a flushing operation.

3.5.2.2 Sources for FRA 765

As previously described, ABCEs 503 in only two ABC Frames 603 are addressable at any given time. The two addressable ABC Frames 603 are Current ABC Frame 607 corresponding to Top Frame 321 in Stack 317 and Next ABC Frame 609 above Current ABC Frame 607. In Preferred Embodiment 701, the addresses of Current ABC Frame 607 and Next ABC Frame 609 are provided to FRA 767 by NFC 753, CFC 749, and FA Mux 761. NFC 753 provides the address of Next ABC Frame 609, CFC 749 provides the address of Current ABC Frame 607, and FA Mux 761 selects one of the addresses provided by CFC 749 and NFC 753 for output to FRA 765.

Both NFC 753 and CFC 749 may be 74S169 4-bit up/down wrap-around counters. When their P and T inputs are inactive, NFC 753 and CFC 749 count up or down in response to a pulse at the CLK input. The direction of the count is determined by the U/D input: if it is active, the counter counts up. When the counter turns over from 15 to 0 or from 0 to 15, the OV output generates a pulse by becoming inactive for a short interval. When the L input is active, the counters are reset to values on their input lines. In the present embodiment, CFC 749's input lines are permanently set to input the value 0, and NFC 753's input lines are permanently set to input the value 1. As will be explained in more detail in the discussion of the flush operation, the L input becomes active only when all ABC Frames 607 are invalidated.

Each time Processor 303 executes a call instruction, one of the microinstructions executed in response to the call instruction increments CFC 749 and NFC 753 by 1, and each time Processor 303 executes a return instruction, one of the microinstructions executed in response to the return instruction decrements CFC 749 and NFC 753 by 1. Thus, CFC 749 is incremented each time a new Frame 319 is added to Stack 317 and decremented each time a Frame 319 is removed from Stack 317, and consequently, Current ABC Frame 607 always corresponds to Top Frame 321. Further, since NFC 753 is always incremented or decremented at the same time as CFC 749, Next ABC Frame 605 is always ABC Frame 603 above Current ABC Frame 607.

Which of CFC 749 and NFC 753 provides a frame address to FRA 765 is determined by FA Mux 761. FA Mux 761 is a quad 2 to one line multiplexer, for example, one of type 74S158. When the S input of FA Mux 761 is active, FA Mux 761 selects NFC 753; otherwise, it selects CFC 749. The S input is active when either input of OR Gate 763 is high. Since these inputs are complemented, the S input is active whenever $\overline{CFL}$ 747 or $\overline{LNEXT}$ 715 is inactive. As will be explained in more detail in the discussion of the operation of Preferred Embodiment 701, $\overline{CFL}$ 747 is inactive when Next ABC Frame 605 is being invalidated. $\overline{LNEXT}$ 715 is inactive when a microinstruction which loads an ABCE 503 in Next ABC Frame 605 is being executed.

3.5.3 Data Rams 773

Data RAMs 773 consist of 12 256 by 4 RAMs which all have ADDR 777 (0 . . . 7) as their address inputs and $\overline{LABC}$ 771 as their write enable input. All Data RAMs 773 are permanently enabled for read operations, and are enabled for write operations when the WE input is inactive, i.e., when when $\overline{LABC}$ 771 is inactive. Data RAMs 773 may be of the type 93422DC, manufactured by Fairchild Camera and Instrument Corporation.

Since all Data RAMs 773 are connected to ADDR 777 (0 . . . 7) a given value on address lines ADDR (0 . . . 7) addresses a 48-bit logical register formed from a single register in each of the RAMs in Data Rams 773. This logical register contains Address Field 609 of ABCE 503, and if ABCE 503 is valid, the logical register contains an address specified by an Argument Pointer 601. Data Outputs (DO) 790 output data to Base Mux 511, and when $\overline{LABC}$ 771 is inactive, Data Inputs (DI) 776 receive data from Cache Loading Bus 527. As will be explained in greater detail below, $\overline{LABC}$ 771 is inactivated by microinstructions specifying load operations on ABC 502.

3.5.4 Components for storing Validity Information

As previously described, each ABCE 503 includes a Validity Field 611 specifying whether the contents of Address Field 609 are valid. In Preferred Embodiment 501, Validity Field 611 is stored in two validity RAMs, VRE 797 and VRO 795. VRE 797 and VRO 795 are each 128 by 1 RAMs, for example, of type 94325A. In both VRE 797 and VRO 795, the DI input receives a single bit of data and the DO output outputs a single bit of data. In order for data to be read from or written to VRE 797 or VRO 795, the CS input must be inactive, and in order for data to be written to VRE 797 or VRO 795, the WE input must be inactive.

Each register in VRE 797 and VRO 795 corresponds to a single logical register in Data RAMs 773; the 128 registers i VRE 797 correspond to the 128 even-numbered logical registers in Data RAMs 773, and the 128 registers in VRO 795 correspond to the 128 odd-numbered registers in Data RAMs 773. The value of the single bit in each register of VRE 797 and VRO 795 indicates whether the logical register in Data RAMs 773 corresponding to that register contains a valid address. In Preferred Embodiment 772, if the bit has the value 0, the corresponding register is valid; otherwise, it is invalid.

The correspondence between logical registers in Data Rams 773 and registers in VRE 797 and VRO 795 is accomplished by connecting ADDR (0 . . . 6) 793, consisting of lines 0 . . . 6 of ADDR (0 . . . 7) 774, to VRE 797 and VRO 795 and ADDR (7) 777, consisting of line 7 of ADDR (0 . . . 7) to logic which selects VRO 795 when an odd-numbered logical register is addressed in Data RAMs 773 and VRE 795 when an even-numbered logical register is addressed. The manner in which VRE 797 and VRO 797 are selected depends on whether ABC 502 is responding to Names 401, is being loaded or flushed, and will be described in more detail in the discussion of these operations.

3.6 Operation of the Preferred Embodiment of ABC 502

The Preferred Embodiment of ABC 502 performs the following operations in response to inputs from Name Bus 328, ADISP 639, and microinstructions:

*When the Preferred Embodiment of ABC 502 resolves an Immediate Name 409 received from either Name Bus 328 or ADISP 639, the Preferred Embodiment produces a data output at DO 790 and a hit/miss signal output at ABC H/M 7105;
*In response to a read RMNC register microcommand, the Preferred Embodiment of ABC 502 responds to ADISP 639 from a specified RMNCER 627 as just described for the resolve operation.
*In response to a call microcommand, the Preferred Embodiment increments CFC 749 and NFC 753 and invalidates new Next ABC Frame 605;
*In response to a return microcommand, the Preferred Embodiment decrements CFC 749 and NFC 753 and invalidates new Next ABC Frame 606;
*In response to an invalidate ABCE microcommand, the Preferred Embodiment invalidates a specified ABCE 503 in Current Frame 607.
*In response to a load current microcommand, the Preferred Embodiment loads a specified ABCE 503 in Current Frame 607 and validates that ABCE 503.
*In response to a load next microcommand, the Preferred Embodiment loads a specified ABCE 503 in Next Frame 605 and validates that ABCE 503.
*In response to a flush microcommand, the Preferred Embodiment invalidates the entire ABC 502.

The operations are discussed in the above order.

3.6.1 Name Resolution

When the Preferred Embodiment of ABC 502 is resolving an Immediate Name 409, none of Lines 705 through 711 and Line 724 specifies an operation and all are active. Consequently, the following conditions hold:

*$\overline{SFL}$ Line 723 is active;
*FLC 729 outputs the value 1 on its third output line;
*SA Register 743 and SB Register 735 contain the value 0;

Because these conditions hold, $\overline{CFL}$ Line 747 is active. In response thereto, I-Name Mux 718 is enabled and FB driver 730 is disabled, so that RA 767 is provided by I-Name Mux 718. Further, $\overline{LNEXT}$ Line 715 is also active, so the output of OR Gate 763 is inactive and FA Mux 761 selects CFC 759 as the source of FRA 765.

Which input is selected by I-Name 718 as the source of RA 767 depends on the value of NTY Field 405 of Name 401 currently on Name Bus 328. This field is input to AND Gate 725. If Name 401 is a Table Name 403, i.e., has a NTY Field 405 with the value 11, AND Gate 725's output is active, OR Gate 726's output is active, and I-Name Mux 718 selects ADISP 639; otherwise, it selects Name Bus 328. Data RAMs 773 are read enabled, and output the contents of Address Field 609 of ABCE 503 specified by ADDR 774 at DO 790.

ADDR (0 . . . 6) 793 further address one register in each of VRE 797 and VRO 795. ADDR (7) 777 is ANDed with DO 796 at AND Gate 7101 and is inverted by Inverter 7100 and ANDed with DO 798 of VRE 795 at AND Gate 799. The outputs of AND Gates 799 and 7101 are then ORed by OR Gate 7103 to produce ABC H/M 7105. If ADDR (0 . . . 7) 774 addresses an even-numbered logical register in Data RAMs 773, ADDR (7) 777 is inactive. Consequently, AND Gate 7101's output is inactive and the output of Inverter 7100 is active. If DO 798 is outputting a 1, signifying that ABCE 503 specified by ADDR (0 . . . 7) 774 is invalid, the output of AND Gate 799 and OR Gate 7103 are both active, producing an ABC miss signal on Line 7105. If ADDR (0 . . . 7) 774 addresses an odd-numbered logical register in Data RAMs 773, ADDR (7) 777 is active, which produces an inactive output from Inverter 7100 and active outputs from AND Gate 7101 and OR Gate 7103 if DO 796 is active. Thus, an ABC miss signal is produced on Line 7105 only if ABCE 503 addressed by ADDR (0 . . . 7) 774 is invalid.

3.6.2 The Read RMNC Register Operation

This operation occurs when RRMREG Line 724 is active. In that case, I-Name Mux 718 selects ADISP 639 as the source of RA 727, and Preferred Embodiment 701 responds as just described for the name resolution operation.

3.6.3 The Call Operation

In the Call Operation, NFC 753 and CFC 749 are incremented and Next ABC Frame 605 is invalidated. When a microinstruction specifies a call operation, $\overline{\text{CALL}}$ 707 is inactive for one clock period and the remainder of Lines 705 through 717 remain active. While $\overline{\text{CALL}}$ 707 is inactive, $\overline{\text{SFL}}$ 723, the output of NOR Gate 721, is inactive. Inactive $\overline{\text{SFL}}$ inactivates the P inputs of NFC 753 and CFC 749 via NOR Gate 755. The U/D inputs of NFC 753 and CFC 749 are connected to $\overline{\text{RET}}$ 709, which is active. Consequently, NFC 753 and CFC 749 are incremented by 1.

The call microcomand also commences the invalidation of the new Next ABC Frame 605. During invalidation, FRA 765 is provided by NFC 753 and RA 767 is provided by FLC 729. Bit 4 of RA 767 is provided by bit 0 from FLC 729, bit 5 by bit 1, and so on. Consequently, the most significant bit provided by FLC 729 is the least significant bit of RA 767. As will be explained in more detail later, FLC 729 only counts from 0 through 7; bit 3 accordingly always has the value 0 when FLC 729 is counting and the values provided to RA 767 are addresses for even-numbered registers in Data Rams 773.

As explained above, the inactivation of $\overline{\text{CALL}}$ 707 for one clock pulse also results in the inactivation of $\overline{\text{SFL}}$ 723 for the same period of time. $\overline{\text{SFL}}$ 723 is connected to the L input of FLC 729 and is complemented and connected to an input of OR gate 741. Consequently, when $\overline{\text{SFL}}$ 723 becomes inactive, FLC 729 is reset to 0 and SA Register 743 is set to 1. When FLC 729 is reset to 0, output line 3 of FLC 729 becomes inactive. That output line is inverted by Inverter 736 and used as inputs to NAND Gate 745 and NAND Gate 737.

Beginning with NAND Gate 745, the other input of NAND Gate 745 is the output of SA 743, which is now 1. Consequently, the output of NAND Gate 745, $\overline{\text{CFL}}$ 747, becomes inactive. $\overline{\text{CFL}}$ 747 is connected to the E input of FB 730, OR Gate 763 and NOR Gate 785; it is complemented by Inverter 728 and connected to the E input of I-Name Mux 718 and the T input of FLC 729. Therefore, FB 730 and FLC 729 are enabled and I-Name Mux 718 is disabled, so that FLC 729 is the source of RA 767. Moreover, FA Mux 761 selects NFC 753 as the source of FRA 763. Further, the output of NOR Gate 785 is inactive and both VRO 795 and VRE 797 are write enabled.

Continuing with NAND Gate 737, at the beginning of an invalidation operation, SB 735 contains the value 0; when FLC 729 is loaded with 0, line 3 becomes inactive, its complement becomes active, NAND Gate 737 has an active and an inactive input, and $\overline{\text{SF}}$ Line 739 is active. $\overline{\text{FL}}$ Line 705 is also active, and accordingly, the output of OR Gate 733 is inactive and SB Register 735 is maintained at 0. As long as SB Register 735 has the value 0, the output of NAND Gate 731 is active, and the P input of FLC 729 is active. Since the T input was also activated when FLC 729 was set to 0, FLC 729 increments itself each clock period until it reaches the value 8 (binary 1000). At that point, output line 3 from FLC 729 changes its value from 0 to 1, $\overline{\text{CFL}}$ Line 739 becomes active, SA Register 735 is set to 0, and the T input of FLC 729 becomes inactive, stopping the counting operation. Further, FB Driver 730 is disabled and I-Name Mux 718 is enabled, so that FLC 729 is no longer the source of RA 767.

For each value produced by FLC 729 while it is counting from 0 through 7, ADDR (0 . . . 6) 793 simultaneously addresses a register in each of VRE 797 and VRO 795. As already pointed out, both VRE 797 and VRO 795 are write enabled; moreover, $\overline{\text{INABC}}$ Line 711 and $\overline{\text{LABC}}$ Line 771 are both active. As a result, the output of OR Gate 783 is inactive, the outputs of AND Gates 787 and 789 are both inactive, and the CS inputs of both VRE 797 and VRO 795 are inactive. $\overline{\text{LABC}}$ Line 771 is further connected to the DI inputs of both VRE 797 and VRO 795, and 1 is therefore written simultaneously to the registers in VRE 797 and VRO 895 addressed by ADDR (0 . . . 6) 793. Thus, during the eight clock periods required for FLC 729 to count from 0 through 7, all 16 registers of VRE 797 and VRO 795 belonging new Next ABC Frame 605 specified by NFC 753 are invalidated.

3.6.4 The Return Operation

In the return operation, NFC 753 and CFC 749 are decremented instead of incremented, and new Next ABC Frame 605 specified by decremented NFC 753 is invalidated. The only difference between the return operation and the call operation is that $\overline{\text{RET}}$ Line 709 becomes inactive for one clock period instead of $\overline{\text{CALL}}$ Line 707. As previously mentioned, $\overline{\text{RET}}$ Line 709 is connected to the U/D inputs of NFC 753 and CFC 749; when it is inactive, NFC 753 and CFC 749 count down. Here, it is inactive for one clock period, and consequently, NFC 753 and CFC 749 are decremented by one.

3.6.5 The Invalidate ABCE Operation

The invalidate ABCE operation invalidates a specified ABCE 503 in Current Frame 607. RA 727 specifying ABCE 603 is received from I-Name Mux 718.

During the operation, $\overline{\text{INABC}}$ 711 is inactive and all other Lines 705 through 717 are active. Since $\overline{\text{SFL}}$ 723 is active and FLC 729 is outputting the value 1 on output line 3, SA 743 is set to 1 and $\overline{\text{CFL}}$ is active, as previously described. Consequently, FB Driver 730 is disabled and I-name Mux 718 is enabled to provide RA 727. As previously described, the values on RRMREG Line 724 or bits 0 . . . 1 of Name Bus 328 determine whether I-Name Mux 718 provides RA 727 from Name Bus 328 or ADISP 739. Further, both $\overline{\text{CFL}}$ 747 and $\overline{\text{LNEXT}}$ 715 are active, causing FA Mux 761 to select CFC 749 as the source of FRA 765. ADDR (0 . . . 6) 793 of ADDR (0 . . . 7) 774 thus provides addresses to one register in each of VRE 797 and VRO 795. As will be explained presently, ADDR (7) 777 selects which of VRE 797 and VRO 795 will be written to.

When $\overline{\text{INABC}}$ 711 is inactive, the output of OR Gate 783 is active. The output of OR Gate 783 serves as an input to NOR Gate 785, AND Gate 789, and AND Gate 787. An active input from OR Gate 783 to these gates has the following consequences:

* The output of NOR Gate 785 is connected to the WE inputs of both VRE 797 and VRO 795; when the output of OR Gate 783 is active, these inputs are inactive and VRE 797 and VRO 795 are write enabled.
* When the output of OR Gate 783 is active, the value of ADDR(7) 780, whose value is the complement of that of ADDR(7) 777, determines whether the outputs of AND Gates 787 and 789 are inactive.

AND Gate 787's output is connected to the CS input of VRE 797 and AND Gate 789's output is connected to the CS input of VRO 796. Therefore, When ADDR(7) is active, the output of AND Gate 789 is inactive and VRO 795 is selected; when ADDR(7) is inactive, the output of AND Gate 787 is inactive and VRE 797 is selected. Since $\overline{\text{LCUR}}$ 713 and $\overline{\text{LNEXT}}$ 715 are active, $\overline{\text{LABC}}$ 771 is active, and the DI inputs of VRE 797 and VRO 795 are active. Therefore, if ADDR (7) 777 selects VRO 795, the register in VRO 795 specified by ADDR (0 . . . 6) 793 is set to 1; if ADDR (7) 777 selects VRE 797, the corresponding register in VRE 797 in set to 1. As a result, ABCE 503 specified by ADDR (0 . . . 7) 774 is invalidated.

3.6.6 The Load Current Operation

The load current operation loads an address derived from an Argument Pointer 601 into an ABCE 503 in Current ABC Frame 603. The address is input via Cache Loading Bus 527 and the source of RA 767 is I-Name Mux 718. The operation provides ADDR (0 . . . 7) 774 to Data Rams 773 and ADDR (0 . . . 6) 793 to VRO 795 and VRE 797 and selects one of VRO 795 and VRE 797 according to the value of ADDR (7) 777 in the same fashion as described for the invalidate ABCE operation. However, in the load current operation, $\overline{\text{LCUR}}$ 713 is inactive. Consequently, the output of NOR Gate 769, $\overline{\text{LABC}}$ 771 is inactive. $\overline{\text{LABC}}$ 711 is connected to the DI inputs of VRO 795 and VRE 797 and to the WE input of Data Rams 773 and its complement serves as an input to NOR Gate 785. NOR Gate 785's output is connected to the WE inputs of VRO 795 and VRE 797. Accordingly, Data Rams 773, VRO 795, and VRE 797 are all write enabled, the value at the DI inputs of VRO 795 and VRE 797 is 0, and at the end of the operation, the address on Cache Loading Bus 527 is written to Address Field 609 in ABCE 503 specified by CFC 749 and the value provided by I-Name Mux 718, and Validity Field 611 belonging to ABCE 503 is set to 0, signifying that ABCE 503 is valid.

3.6.7 The Load Next Operation

The load next operation is identical to the load current operation except that ABCE 503 being loaded is in Next ABC Frame 607. During the operation, $\overline{\text{LNEXT}}$ is inactive. As a result, the output of OR Gate 763 is active and FA Mux 761 selects NFC 753 as the source of FRA 765.

3.6.8 The Flush Operation

The flush operation invalidates all ABCEs 503 in ABC 502. Addresses are generated by FLC 729 and CFC 749. FLC 729 is held at 0 while CFC 749 counts from 0 through 15; then FLC 729 is incremented, and CFC 749 again counts from 0 through 15. As described in the discussion of the invalidate ABC operation, both VRE 797 and VRO 795 have inactive CS and WE inputs and active DI inputs; consequently, each time an address is generated by CFC 749 and FLC 729, the registers specified by ADDR (0 . . . 6) in both VRE 797 and VRO 795 are invalidated; when FLC 729 reaches the value 8, all registers in VRE 797 and VRO 975 have been invalidated and the flush operation cases.

The flush operation begins when $\overline{\text{FL}}$ Line 705 is inactivated for one clock period. In consequence, $\overline{\text{SFL}}$ Line 723 is inactivated as well. Inactive $\overline{\text{SFL}}$ Line 723 resets FLC 729 to 0, resets SA Register 735 to 1, and by way of NOR Gate 755, inactivates the P inputs of CFC 749 and NFC 753. Inactive $\overline{\text{FL}}$ Line 705 sets SB Register 735 to 1, resets CFC 749 to 0 and NFC 753 to 1. As long as SB Register 735 has the value 1 and output line 3 of FLC 729 has the value 0, $\overline{\text{SF}}$ 739 is inactive. $\overline{\text{SF}}$ serves an an input to NOR Gate 755, and thus both counters increment each clock period until one of the above conditions changes.

Since line 3 of FLC 729 has the value 0 and SA 743 the value 1, $\overline{\text{CFL}}$ 747 is inactive as well as $\overline{\text{SF}}$ 739. Inactive $\overline{\text{CFL}}$ 747 provides an active input via OR Gate 763 to FA Mux 761, and thereby causes FA Mux 761 to select NFC 754 as the source of FRA 765. Inactive $\overline{\text{CFL}}$ 747 also disables I-Name Mux 718 and enables FB 730, and thereby selects FLC 729 as the source of RA 767. Finally, inactive $\overline{\text{CFL}}$ activates the T input of FLC 729.

While CFC 749 is counting from 0 through 15 and NFC 753 from 1 through 15 to 0, the OV output of CFC 749 and $\overline{\text{CO}}$ Line 751 connected thereto are active. $\overline{\text{CO}}$ Line 751 serves as one input to NAND Gate 731 and SB 735 provides the other input. Since SB 735 has the value 1, the output of NAND Gate 731 is inactive as long as $\overline{\text{CO}}$ Line 751 is active and FLC 729 does not count. However, when the value in CFC 749 changes from 15 to 0, CFC 759's OV output becomes inactive and produces a short pulse. Since SB 735 retains the value 1, the output of Nand Gate 731 becomes active and FLC 729 is incremented by 1. The process just described continues until FLC 729 reaches the value 8. At that point, line 3 of FLC 729 changes its value from 0 to 1 and $\overline{\text{CFL}}$ Line 747 and $\overline{\text{SF}}$ Line 739 both become active. Active $\overline{\text{CFL}}$ Line 745 sets SA Register 743 to 0, disables FB 730, and enables I-Name Mux 718. Active $\overline{\text{SF}}$ Line 739 sets SB Register 735 to 0 and causes the P inputs of NFC 753 and CFC 749 and the T input of FLC 729 to become active, thereby halting NFC 753, CFC 749, and FLC 729. When halted, NFC 753 contains the value 1, CFC 749 the value 0, and FLC 729 the value 8.

3.7 The Preferred Embodiment of ABC 502 in Operations of Processor 301

The operations of the Preferred Embodiment of ABC 502 which have just been described are combined in certain operations of Processor 301. When Processor 301 executes a call instruction, the microcode executed by Control 327 in response to the call instruction first loads Argument Pointers 601 for arguments used in the call instruction into new Top Frame 321 created by the call instruction. Each time it loads an Argument Pointer 601 into new Top Frame 321, it employs the load next operation to load an address corresponding to the argument pointer into the location in Next ABC Frame 605 which corresponds to the location of Argument Pointer 601 in new Top Frame 321. Then the microcode which executes the call instruction carries out the call operation. As described, the call operation increments CFC 749 and NFC 753, thereby making Next ABC Frame 605 into Current ABC Frame 607, and then invalidates new Next ABC Frame 605.

When Processor 301 executes a return instruction, the microcode executed by Control 327 in response to the return instruction carries out the return operation, which decrements CFC 749 and NFC 753, thereby making Current ABC Frame 607 into new Next ABC Frame 605, and then invalidates new Next ABC Frame 605.

When Processor 301 resolves a Name 401 and an ABC miss occurs, microcode executed by Control 327 in response to the ABC miss retrieves the current value of RA 767 from ABC Trap 770, constructs Immediate Name 409 from which RA 767 was obtained from that value, fetches Argument Pointer 601 corresponding to Immediate Name 409 from Top Frame 321, and uses the load current operation to load the address corresponding to Argument Pointer 601 into Address Field 609 of ABCE 503 in Current ABC Frame 607 specified by Immediate Name 409 constructed from ABC Trap 770.

3.8 Description of a Preferred Embodiment of RMNC 517—FIG. 8

The discussion now turns to a preferred embodiment of RMNC 517. FIG. 8 presents preferred Embodiment 801 of RMNC 517. During the discussion, reference will also be made to FIG. 6A, presenting the logical structure of a RMNCE 519. The shaded portions of FIG. 8 represent fields in a single RMNCE 519 and show their relationship to Preferred RMNC Embodiment 801.

Preferred RMNC Embodiment 801 is a direct-mapping 256-entry cache which is addressed by Table Names 403 received on Name Bus 328. Each valid entry in Preferred RMNC Embodiment 801 corresponds to a Table Name 403 having an NTE 310 in Name Table 309 being used by Procedure 311 currently being executed by ICS 301. However, a Name Table 309 in ICS 301 may have up to 214 NTEs 310, while Preferred RMNC Embodiment 801 has only 28 RMNCEs 519. The 2**8 RMNCEs 519 are addressed by the 8 least-significant bits of NT_IND Field 407 in Table Names 403 appearing on Name Bus 328. These bits make up bits 8–15 of Name Bus 328 and are labelled as IND (8 ... 15) 817 in FIG. 8.

Of course, Table Names 403 corresponding to up to to 2**6 different NTEs 310 may have identical bits 8–15. Whether a RMNCE 519 does in fact correspond to a given Table Name 403 is determined by an entry tag associated with each valid RMNCE 519 in Preferred RMNC Embodiment 801. The entry tag for a valid RMNCE 519 consists of the 6 most-significant bits of NT_IND Field 407 from Table Name 403 corresponding to RMNCE 519. When a Table Name 403 is presented to Preferred RMNC Embodiment 801, the 6 most-significant bits of NT_IND Field 407 are carried on bits 2–7 of Name Bus 328. These bits are labelled as TAG (2 ... 7) 819 in FIG. 8. The value carried by TAG 819 is compared with the entry tag associated with RMNCE 519 addressed by IND 817. If TAG 819 and the entry tag are identical and RMNCE 519 is valid, then RMNCE 519 corresponds to Table Name 403. If TAG 813 and the entry tag are not identical, or if RMNCE 519 is invalid, a RMNC miss results.

3.8.1 Components of Preferred EMNC Embodiment 801

Turning first to the buses which provide keys and data to Preferred RMNC Embodiment 801 and receive outputs from Preferred RMNC Embodiment 801, Preferred RMNC Embodiment 801 receives keys from Name Bus 328. Name Bus 328 is subdivided in FIG. 8 into components whose values have different functions in Preferred RMNC Embodiment 801:

- *Bits 0 ... 1 of Name Bus 328, labelled here as NT (0 ... 1) 821, carry NTY Field 405 of Names 401.
- *Bits 2 ... 7 of Name Bus 328, labelled here as TAG (2 ... 7) 819, carry the six most significant bits of NT_IND Field 407 of Table Names 403.
- *Bits 8 ... 15 of Name Bus 328, labelled here as IND (8 ... 15) 817, carry the eight least significant bits of NT_IND Field 407.

Preferred RMNC Embodiment 801 receives data from Cache Loading Bus 527, VL Bus 810, and ID Loading Bus 808. The function of Cache Loading Bus 527 has already been described; VL Bus 810 provides validity information for V Field 622 of RMNCEs 519 and ID Loading Bus 808 provides location codes for ID Field 623. Preferred RMNC Embodiment 801 outputs data to Displacement Mux 525, to Descriptor Bus 333, to Control 327, to CTL 515, and to ABC 502, as described in the discussion of RMNCEs 519.

Preferred RMNC Embodiment 801 consists of the following devices:

- *Data Store 813, containing 1024 Data Store Registers 815. Each RMNCE 519 includes four Data Store Registers 815, which are used to store RMNCER 627 (0) through (3).
- *Tag Store 806, containing 256 Tag Store Registers 807. Each Tag Store Register 807 805 is associated with one RMNCE 519. Tag Store Register 807 for a given RMNCE 519 includes the entry tag associated with RMNCE 519 and parts of Control Fields 620.
- *Validity Store 804, containing 256 V Registers 805. Each V Register 805 is associated with one RMNCE 519 and contains V Field 622 for that RMNCE 519.
- *ABC Flag Store 802, containing 256 ABC Flag Registers 803. Each ABC Flag Register 803 is associated with one RMNCE 519 and contains ABCF Field 621 for that RMNCE 519.
- *Comparator 811. Comparator 811 compares the entry tag for RMNCE 519 addressed by IND 817 with the value of TAG 819 and if they match, checks whether that RMNCE 519 is valid. If the entry tag and TAG 819 do match and that RMNCE 519 is valid, Comparator 811 provides a RMNC hit signal to CTL 515; otherwise, it provides a RMNC miss signal.

Each of these components will be described in more detail below, and then the operation of RMNC Preferred Embodiment 801 will be described.

3.8.1.1 Data Store 813

In Preferred RMNC Embodiment 801, Data Store 813 may consist of 15 1024 by 4 static MOS RAMs of type 2149 having an access time for reading data of 45 ns. The 8 most significant bits of the addresses for the RAMs are provided by IND 817 from Name Bus 328. The remaining two bits are provided by RM Register Address 812. RM Register Address 812 has a default setting of 0. Consequently, the bits provided by IND 817 specify RMNCER (0) 627 for a given RMNCE 519. Microcode executed by Control 327 can set RM Register Address 812 to other values and thereby can address any RMNCER 627 in a RMNCE 519 specified by IND 817.

Data inputs to Data Store 813 are provided by Cache Loading Bus 527; the contents of a given RMNCER 627 may be output in their entirety to Descriptor Bus 333, or fields of a given RMNCER 627 may be output as follows: Displacement Field 629 to Displacement Mux 525; Base Field 641 to CTL 515; and ADISP Field 639 to ABC 502.

3.8.1.2 Tag Store 806

Tag Store 806 may consist of 13 1024 by 1 RAMs of type 2125 H3 having an access time on a read operation of 30 ns. The 8 most significant bits of addresses for the RAMs in Tag Store 806 are provided from IND 817; the two least significant bits are held to 0, and consequently, only Tag Store Registers 807 corresponding to RMNCERs 617 (0) are addressable. Each addressable Tag Store Register 807 contains ID Field 623 and BC Field 625, a copy of Base Field 641, of RMNCE 619; they further contain E_TAG Field 809, whose value is the entry tag for RMNCE 519 currently stored at that address in RMNC 517. E_TAG Field 806 is loaded from TAG 819, BC Field 625 is loaded from Cache Loading Bus 527 at the same time that RMNCER (0) 627 in Data Store 813 is loaded, and ID Field 623 is loaded via ID Loading Bus 808.

In Preferred RMNC Embodiment 801, ID Field 623 contains a four-bit value from which Control 327 derives the location of the first microinstruction in the microinstruction sequence which processes RMNCE 519 to which ID Field 623 belongs. The contents of ID Field 623 are provided in Preferred RMNC Embodiment 801 by a PROM. In other embodiments, microcode may set ID Field 623 as required and may read ID Field 623 to determine how to process RMNCE 519 to which ID Field 613 belongs. Data output from ID Field 623 goes to Control 327. Data output from BC Field 625 goes to CTL 515; data output from E_TAG Field 809 goes to Comparator 811.

3.8.1.3 Validity Store 804

Validity Store 804 consists of two 1024 by 1 RAMs of type 2125 H3, having an access time of 30 ns on a read operation. Validity Store 804 is implemented in the same fashion as described in the discussion of Preferred Embodiment 772 of ABC Registers 504. One of the two RAMs contains V Fields 622 for even-number RMNCEs 519 and the other contains V Fields 622 for odd-numbered RMNCEs 519. The 7 most significant bits of IND 817 are used to form the most significant bits of addresses for both RAMs, and the remaining bits of the addresses are set to 0. In consequence, only every eighth register in each RAM is addressable.

When RMNC 517 outputs data, logic responsive to the least significant bit of IND 817 selects either output from the RAM containing V Fields for even-numbered RMNCEs 519 or output from the RAM containing V Fields for odd-numbered RMNCEs 519 in the same fashion as described for ABC validity RAMS VRE 797 and VRO 795. Similarly, when data is written to V Field 622, logic responsive to the least significant bit selects one RAM or the other, depending on the value of the least significant bit. When all RMNCEs 519 are to be invalidated, both RAMs are selected, and registers in both RAMs are invalidated in parallel. Addresses for the invalidation operation are generated by Addressing Logic 733 as described in the discussion of ABC 502.

Validity Store 804 is loaded by means of VL Line 810, which provides a value of 0 when RMNCER 627 (0) of RMNCE 519 to which Validity Store Register 805 belongs is loaded and a value of 1 when that RMNCE 519 is invalidated. Output from Validity Store 804 goes to Comparator 811.

3.8.1.4 ABC Flag Store 802

ABC Flag Store 802 in Preferred RMNC Embodiment 801 consists of a single 2125 H1 1024 by 1 RAM, having an access time of 20 ns on the read operation. ABC Flag Store 802 is addressed in the same fashion as Tag Store 802. Each addressable register in ABC Flag Store 802 contains ABCF Field 621 for RMNCE 519 specified by IND 817. Data is input to ABC Flag Store 802 from Cache Loading Bus 527, and output to CTL 515.

3.8.1.5 Comparator 811

Comparator 811 consists of logic which determines the following:
* Whether the value in E_TAG Field 809 associated with RMNCE 517 specified by IND 817 is the same as the value on TAG 819.
* Whether Validity Field 622 of RMNCE 517 indicates that RMNCE 517 is valid.

If the value on TAG 819 is the same as that stored in E_TAG 809 and if Validity Field 622 specifies a valid RMNCE, Comparator 811 provides a RMNC hit signal signifying that Table Name 403 has an entry in RMNC 517 to CTL 515. Otherwise, Comparator 811 provides a RMNC miss signal.

Comparator 811 is implemented in Preferred RMNC Embodiment 801 by means of AND gates receiving corresponding bits of the data to be compared and a NOR gate whose inputs are the outputs of the AND gates.

3.9 Operation of Preferred RMNC Embodiment 801

The discussion of the operation of Preferred RMNC Embodiment 801 will deal first with its operation during the name resolution operation and then with its operation under microcode control.

3.9.1. Name Resolution with Preferred RMNC Embodiment 801

The discussion of name resolution with Preferred RMNC Embodiment 801 first deals with those cases in which Preferred RMNC Embodiment 801 does not contain an RMNCE 519 corresponding to a Name 401 and then with those in which it does.

The first case in which Preferred RMNC Embodiment 801 does not contain an RMNCE 519 corresponding to a Name 401 is when Name 401 is an Immediate Name 409. In that case, NTY Field 405 has a value other than binary 11. CTL 515 responds to values other than 11 by enabling a source other than RMNC 517 for Displacement Mux 525, and as previously explained, ABC 502 responds to such values by selecting Name Bus 328 as the source for RA 727. Thus, as required by values of NTY Field 405 other than binary 11, the address output by Improved Address Caches 501 is formed without involvement of RMNC 517.

In the second and third cases, NTY Field 405 has a value of binary 11 and RMNC 517 may contain an RMNCE 519 corresponding to Table Name 403. Lack of such an RMNCE 519 may be detected in two ways: RMNCE 519 may have V field 622 set to indicate an invalid RMNCE 519, or RMNCE 519 may have associated with it an E_TAG Field 802 containing a value different from that on TAG 819.

In both cases, Tag Store 806 and Validity Store 622 output V Field 622 and E_TAG 809 for RMNCE 519 to Comparator 811. Comparator 811 detects the fact that RMNCE 519 is invalid and provides a miss signal to CTL 515. In response to the miss signal, CTL 515 generates a signal to Control 327 which causes Control 327 to begin executing a RMNC cache miss microinstruction sequence. As mentioned in the descriptions of Validity Store 804 and Tag Store 806, the RAMs making up these components have a faster speed of operation than those making up Data Store 813. Consequently, execution of the cache miss microcode sequence begins at the same time that the invalid data is provided to Address Adder 513, and the invalid data is ignored.

The cache miss microinstruction sequence retrieves Table Name 403 which caused the miss from Name Trap 431 and then uses the current value in Name Table Register 332 and NT_IND Field 407 to locate NTE 310 corresponding to Table Name 403. The microinstruction sequence then encaches information derived from NTE 310 in RMNCE 519 specified by IND 819 from Table Name 403 which caused the miss. The manner in which RMNCE 519 is loaded is under microinstruction control and corresponds to the kind of NTE 310 containing the information being loaded. When loading is complete, the microcode sequence processes the encached information as it would in the case of a hit on RMNC 517 and provides the desired descriptor to Descriptor Bus 333.

When RMNC 517 does contain an RMNCE 519 for a Table Name 403, the operation of RMNC 517 depends on the contents of ID Field 623 and BC Field 625 in RMNCE 519. Broadly speaking, ID Field 623 specifies whether microcode intervention is necessary to process the contents of RMNCE 519 and if so, what microcode sequence is to be executed by Processor 303. BC Field 625 specifies the manner in which CTL 515 is to select inputs for Base Mux 511 and Displacement Mux 525. In Preferred Embodiment 801, BC Field 625 has the following codes:

| Code | Meaning |
|------|---------|
| 000 | Direct Address; Base = FP |
| 010 | Direct Address; Base = SDP |
| 100 | Direct Address; Base = PBP |
| 001 | Indirect Address; Base in ABC |
| 111 | Complete Address |

Beginning with the cases in which microcode intervention is unnecessary, if RMNCE 519 contains a complete address, BC Field 625 has the code 111 and the address is stored in Displacement Field 629 of RMNCER 627 0. ID Field 623 specifies no microcode intervention and CTL 515 responds to BC Field 625 by selecting RMNC 517 as the input for Displacement Mux 525 and causing Address Adder 513 to pass the value from Displacement Mux 525 through unchanged to Descriptor Bus 333. As mentioned above, the address produced by RMNC 517 from IND 817 is that of RMNCER 627 0, and the contents of Displacement Field 629 from RMNCER 627 (0) are thus output via Address Adder 513 to Descriptor Bus 333.

If RMNCE 519 contains a displacement from FP, SDP, or PBP, BC Field 625 has the codes 000, 010, or 100, ID Field 623 specifies no microcode intervention, and Displacement Field 629 of RMNCER 627 (0) contains the displacement. CTL 515 responds to the codes in BC Field 625 by selecting the register of ABRC 504 containing the base address specified by BC Field 625 as the source for Base Mux 511 and RMNC 517 as the input for Displacement Mux 525. Consequently, Address Adder 513 adds the base address in the specified register of ABRC 504 to the displacement in RMNCER 627(0) to produce the desired address.

If RMNCE 519 contains a displacement from an Argument Pointer 601, ABCF Field 621 is set, BC Field 625 has the code 001, Displacement Field 629 of RMNCER 627 (0) contains the displacement, and ADISP Field 639 of the RMNCER contains the offset of Argument Pointer 601 from FP. As mentioned above, ABC Flag Store 802 is a 20 ns RAM. Consequently, the value of ABCF Field 621 reaches CTL 515 before the values of BC Field 625, Displacement Field 629, or ADISP Field 639. In Preferred Embodiment 801, CTL 515 responds to ABCF Field 621 by producing a signal which causes Control 327 to extend the current machine cycle of Processor 301 until the value of ADISP Field 639 can be employed as an input to ABC 502.

CTL 515 responds to the code in BC Field 625 by causing Base Mux 511 to select its input from ABC 502 and Displacement Mux 525 to select Displacement Field 629. As explained in the discussion of ABC 502, the code 11 on NTY 821 causes ABC 502 to select ADISP Field 639 provided by RMNC 517 as its input. When no microcode intervention has taken place, ADISP Field 639 comes from RMNCER 627 (0). If there is a valid ABCE 502 corresponding to the value of ADISP Field 639, ABC 502 outputs its contents to Base Mux 511. Address Adder 513 then combines the base address from ABC 502 with the value of Displacement Field 629 in RMNCER 627 (0) to produce the address represented by Table Name 403. If ABC 502 does not contain the address derived from the argument pointer specified by ADISP Field 639, an ABC cache miss results and is serviced as previously described. After the proper ABCE 503 has been loaded, the operation described is repeated.

3.9.2 Operations Performed by Preferred RMNC Embodiment 801 under Microcode Control Under microcode control, Preferred RMNC Embodiment 801 performs the following operations:
* Load RMNCER: RMNCER 627 0, 1, 2, or 3 of RMNCE 519 specified by IND 815 is loaded from Cache Loading Bus 527. The microcommand specifies the desired RMNCER 627.
* Invalidate RMNCE: RMNCE 519 specified by IND 817 is invalidated by setting V Field 622 to indicate that RMNCE 519 is invalid.
* Flush: RMNC 517 and ABC 502 are invalidated. Addresses for the invalidation are generated as described in the discussion of ABC 502.

*Resolve RMNCER: CTL 515 responds to RMNCER 627 0, 1, 2, or 3 of RMNCE 519 specified by IND 817 in the same manner as it responds to RMNCER 627 0 in the resolve operation.

*Read RMNCER: The contents of RMNCER 627 0, 1, 2, or 3 of RMNCE 519 specified by IND 817 are placed directly onto Descriptor Bus 333. The microcommand specifies the desired RMNCER 627.

The operations are discussed in the above order.

3.9.2.1 The Load RMNCER Operation

The Load RMNCER operation is employed by the RMNC miss microinstruction sequence. RMNCE 519 being loaded is selected by the value on Name Bus 328 during the load operation; RMNCER 627 within RMNCE 519 is specified by the microcommand for the load instruction. Unless RMNCER 617 (0) is specified for the load operation, a RMNC miss results if the value in E_TAG 809 does not match the value on TAG 819 or if V Field 622 in RMNCE 519 specifies an invalid RMNCE 519. When a load operation is performed on RMNCER 627 0, RMNC 517 automatically sets BC Field 625 to the same value as Base Field 641, E TAG 809 to the value of TAG 819, and V Field 622 to specify a valid RMNCE 519. If Base Field 641 specifies an address encached in ABC 502 as a base, RMNC 517 also automatically sets ABCF 621 to so specify. In Preferred RMNC Embodiment 801, ID Field 623 is set automatically if RMNCER 627 (0) or RMNCER 627 (1) is the last register loaded; if RMNCER 627 (2) or RMNCER 627 (3) is the last register loaded, the microinstruction sequence may specify the value of ID Field 623.

3.9.2.2 The Invalidate RMNCE and Flush Operations

The invalidate RMNCE operation is employed when invalidation of a single RMNCE 519 is required, for example, to mark a RMNCE 519 as invalid until all RMNCERs 627 have been loaded. The RMNCE 519 being invalidated is specified by the value of IND 817; the operation simply sets V Field 622 of the specified RMNCE 519 to specify an invalid RMNCE 519.

The flush operation is employed when all entries in Improved Address Caches 501 must be invalidated. NFC 753 and FLC 729 provide addresses of RMNCEs 610 as described in the discussion of ABC 602, and as each RMNCE 610 is addressed, its V Field 622 is set to 0 as explained in the discussion of Validity Store 804. As previously explained, such general invalidation is required only when the execution of a call or return instruction results in a change in the value of SDP, PBP, or NTP, or when ICS 301 executes a program employing a different Stack 317.

3.9.2.3 The Read RMNCER and Resolve RMNCER Operations

The read RMNCER operation outputs the contents of RMNCER 627 specified by the microcommand in RMNCE 519 specified by the value on Name Bus 328 to Descriptor Bus 333. If the value in E_TAG Field 809 does not match the value of TAG 819, or if the specified RMNCE 519 is invalid, a RMNC miss signal results and the RMNC miss microinstruction sequence is executed.

In the resolve RMNCER operation, the microcommand specifies a RMNCER 627 in RMNCE 519 addressed by the value on Name Bus 328. In the operation, CTL 515 responds to the contents of Base Field 641 in the specified RMNCER 627 in the same fashion as it responds to the contents of BC Field 625 in the resolve operation. Thus, CTL 515 causes Displacement Mux 525 to select Displacement Field 629 and Base Mux 511 to select a register in ABRC 504 or the output of ABC 502. If there is no RMNCE 519 corresponding to the value on Name Bus 328, a RMNC miss signal results.

3.9.3 Example of Operation of RMNC 517 under Microcode Control—FIG. 9

The manner in which RMNC 517 operates under microcode control may be illustrated by describing how a Table Name 403 specifying an element of an array is resolved. NTE 310 in ICS 301 for an element of an array specifies three things:

*The displacement of the array from a base address.
*The index of the array element.
*The size of the array element.

In NTEs 310 in ICS 301, the base address, the value of the index, and the size may each be represented by a Name 401. For the present example, it is assumed that the base address for the array is SDP, that the displacement is 64, that the array index is the first argument used to invoke Procedure 311 containing Table Name 403, and that the size of the array element is 80. Since the array index is an argument, it may be represented in NTE 310 by an Immediate Name 409 specifying an Argument Pointer 601. When Table Name 403 is first presented to RMNC 517, a RMNC miss occurs and microcode loads RMNCE 519 corresponding to Table Name 403 with information from NTE 310.

FIG. 9 illustrates the resulting RMNCE 519. For the purposes of the example, it is assumed that RMNCER 627 (0) contains information from which the address of the index may be resolved, RMNCER 627 (1) contains the element size, and RMNCER 627 (2) contains information from which the address of the array may be resolved. RMNCER 627 (3) is unused. Other arrangements are of course possible. In general, however, the information for the index is placed in RMNCER 627 (0) because the index value is required to calculate the array element's address, and therefore must be fetched from Memory 305 while the address of the array itself is being obtained from the information in RMNCER 627 (2).

RMNCER 627 (0)'s ABCF Field 621 is set to indicate that ABC 502 provides the base; ID Field 623 contains a value from which Control 327 can derive the location of the microinstruction sequence used to process RMNCEs 617 for arrays; BC Field 625 and Base Field 641 both contain the code 001, specifying a base encached in ABC 501; Displacement Field 629 contains the value 0, and ADISP Field 639 specifies Argument Pointer 601 at displacement −128 from FP. RMNCER 627 (1) contains only the element size, 80, in Displacement Field 629. Base Field 641 and ADISP Field 639 are unused. In RMNCER 627 (2), Displacement Field 629 contains 64, the displacement of the array from SDP and Base Field 641 contains the code 010, specifying a direct address based on SDP. ADISP Field 639 is unused.

When Table Name 403 corresponding to the example RMNCE 519 appears on Name Bus 328, a RMNC hit occurs. In response to BC Field 625 of RMNCER 627 (0), CTL 515 causes Displacement Mux 525 to select Displacement Field 629 as its input and Base Mux 511 to select ABC 502 as its input. ABC 502 uses the value of ADISP 639 to locate ABCE 503 in Current ABC Frame 607 containing the address represented by the first Argument Pointer 601 in Top Frame 321 and outputs the address. Address Adder 513 adds the 0 contained in Displacement Field 629 to the address from ABC 502, and thus the address corresponding to Argument Pointer 601 for the first argument is output to Descriptor Bus 333.

At the same time, the value of ID Field 623 is output to Control 327 and Control 327 begins executing the microinstruction sequence for processing array RMNCEs 519. The microinstruction sequence begins by using the address obtained from the resolution of RMNCER 627 0 to perform a memory read operation. The read operation will return the value of the array index to Descriptor Processor 329. While waiting for the index value to return, the microinstruction sequence uses the resolve RMNCER operation for RMNCER 627 (2) to obtain the array address. In that operation, Base Field 641 is output to CTL 515, which responds by causing Base Mux 511 to select SDP Register 507 as its input and Displacement Mux 525 to select Displacement Field 629 from RMNCER 627 (2). Address Adder 513 then adds the 64 contained in Displacement Field 629 to the current value of SDP Register 507 and outputs the result to Descriptor Bus 333. The microinstruction sequence stores the array address thus produced in a register in Descriptor Processor 329 and uses the read RMNCER operation to obtain the element size from Displacement Field 629 of RMNCER 627 (1). The read RMNCER operation simply outputs the contents of RMNCER 627 (1) to Descriptor Bus 333, and the microcode sequence manipulates them to obtain the value of Displacement Field 629. By this time, the index value has returned from Memory 305, and the microinstruction sequence employs components of Descriptor Processor 329 to calculate the address of the array element by multiplying the index value by the element size and adding the result to the array address.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. In a digital computer system including
    (1) processing means for performing operations on data in response to instructions,
    (2) memory means for storing data items of said data and said instructions and for receiving said data items from said processing means and providing said data items and said instructions to said processing means in response to certain signals from said processing means, said certain signals including addresses specifying locations in said memory means, and
    (3) communication means for transferring said instructions, said certain signals, and said data items between said processing means and said memory means, and wherein said memory means includes a memory stack containing a plurality of memory frames containing certain data items whose values do not change for the life of said memory frame containing said certain data items, said memory frames including a top memory frame containing said certain data items currently being used by said processing means, and said data items in said top frame being addressed by means of a displacement from a memory frame base address of said addresses associated with said memory top frame, encachement apparatus comprising:
    (1) means for receiving said displacement;
    (2) a plurality of cache frames including first certain ones of said plurality of cache frames corresponding to certain ones of said memory frames including said top memory frame, each said first certain cache frame containing copies of said certain data in said corresponding memory frame;
    (3) cache frame selection means for selecting said first certain cache frame corresponding to said top memory frame as a current cache frame; and
    (4) means connected to said displacement receiving means and said cache frame selection means for outputting said copy of said certain data specified by said displacement from said current cache frame in response to said displacement.

2. In the encachement apparatus of claim 1, and wherein:
    said cache frame selection means further selects a next cache frame not corresponding to any of said memory frames and
    said encachement apparatus further includes
    (1) means for receiving each one of said copies in said encachement apparatus,
    (2) means for providing said copies to said copy receiving means, and
    (3) data writing means responsive to said copy receiving means, said displacement corresponding to each one of said copies, and said cache frame selection means for writing said each copy into said next cache frame.

3. In a digital computer system including
    (1) processing means for performing operations on data in response to instructions,
    (2) memory means for storing data items of said data and said instructions and for receiving said data items from said processing means and providing said data items and said instructions to said processing means in response to certain signals from said processing means, said certain signals including addresses specifiying locations in said memory means, and
    (3) communication means for transferring said instructions, said certain signals, and said data items between said processing means and said memory means,
    and wherein
    said memory means includes a memory stack containing a plurality of memory frames containing certain data items whose values do not change for the life of said memory frame containing said certain data items, said memory frames including a memory top frame containing said certain data items currently being used by said processing means, and said data items in said memory top frame being addressed by adding a displacement to a frame base address of said addresses associated with said top frame,
    said processing means performs a first operation including constructing a new said memory top frame on said memory stack and modifying said frame base address to specify said new memory top frame, and
    said processing means performs a second operation including modifying said frame base address to specify said memory frame preceding said memory top frame on said memory stack, encachement apparatus for encaching copies of said certain data contained in certain memory frames of said memory stack including said memory top frame and outputting said copy of said certain data contained in said memory top frame in response to said displacement specifying the location of said certain data in said memory top frame, said encachement apparatus comprising:

(1) a first plurality of register means for storing said copies and outputting one of said copies from one register means of said first plurality of register means in response to a cache address specifying said one register means, said first plurality of register means being divided into a plurality of cache frames, each one of said cache frames including a second plurality of said register means, and said cache address including a cache frame address specifying one cache frame of said plurality of cache frames and a register address specifying one register means of said second plurality of register means in said one cache frame specified by said cache frame address;

(2) means for receiving said displacement in said encachement apparatus;

(3) addressing means connected to said displacement receiving means and to said first plurality of register means for providing said cache address in response to said displacement and including (a) first cache frame addressing means responsive to a next frame signal for providing a next cache frame address of a succession of said cache frame addresses as said frame address in response to said next frame signal and otherwise providing a current cache frame address immediately preceding said next cache frame address in said succession as said cache frame address;

(b) incrementing means responsive to said first operation for changing said current cache frame address to said cache frame address in said succession following said current frame address and said next cache frame address to said cache frame address folling said next frame address in said succession, (c) decrementing means responsive to said second operation for changing said current frame address to said frame address in said succession preceding said current frame address and said next cache frame address to said cache frame address in said succession preceding said next cache frame address, and (d) register address providing means for deriving said register address in said address from said displacement;

(4) data receiving means for receiving said copies to be stored in said register means;

(5) data writing means responsive to said cache address and said data receiving means for writing said copies received by said data receiving means into said register means specified by said cache address in response to a load signal; and (6) cache loading means responsive to said first operation for providing said copy of said certain data at a certain displacement to said data receiving means, providing said certain displacement to said displacement receiving means, providing said load signal to said data writing means, and providing said next cache frame signal to said cache frame addressing means before said incrementing means increments said current cache frame address, whereby certain ones of said cache frames correspond to said memory frames, said current cache frame corresponds to said top frame, and said cache apparatus outputs said copy of said certain data at said displacement from said frame address in response to said displacement.

4. In a digital computer system including (1) a stack in memory containing memory stack frames including certain data whose value does not change for the life of said memory stack frame, said memory stack frames including a memory stack top frame, and (2) a cache for enriching said certain data containing a circular stack cache including stack cache frames corresponding to certain ones of said memory stack frames, said stack cache frames including a current stack cache frame corresponding to said memory stack top frame, the method of encaching copies of said certain data in said cache comprising the steps of:

(1) loading said certain data into a next stack cache frame following said current frame;

(2) loading said certain data into a new top frame in said memory stack following said top frame; and (3) establishing said next frame as said current frame.

* * * * *